United States Patent
Yonaha et al.

(10) Patent No.: US 7,680,357 B2
(45) Date of Patent: Mar. 16, 2010

(54) METHOD AND APPARATUS FOR DETECTING POSITIONS OF CENTER POINTS OF CIRCULAR PATTERNS

(75) Inventors: Makoto Yonaha, Kanagawa-ken (JP); Tao Chen, Kawasaki (JP)

(73) Assignee: Fujifilm Corporation, Tokyo (JP)

( * ) Notice: Subject to any disclaimer, the term of this patent is extended or adjusted under 35 U.S.C. 154(b) by 1438 days.

(21) Appl. No.: 10/935,745

(22) Filed: Sep. 8, 2004

(65) Prior Publication Data

US 2005/0105827 A1    May 19, 2005

(30) Foreign Application Priority Data

Sep. 9, 2003    (JP) .............................. 2003-317577

(51) Int. Cl.
*G06K 9/36*    (2006.01)
(52) U.S. Cl. .................... 382/281; 382/192; 382/291
(58) Field of Classification Search ................ 382/192, 382/281, 291
See application file for complete search history.

(56) References Cited

U.S. PATENT DOCUMENTS

| 6,016,354 | A  | * | 1/2000 | Lin et al. ..................... 382/117 |
| 6,292,583 | B1 | * | 9/2001 | Maruo ......................... 382/149 |
| 7,346,210 | B2 | * | 3/2008 | Chen ............................ 382/162 |
| 2001/0052928 | A1 | * | 12/2001 | Imagawa et al. ........ 348/14.12 |
| 2002/0015523 | A1 | * | 2/2002 | Okada et al. ................ 382/167 |

FOREIGN PATENT DOCUMENTS

JP    2003-70742 A    3/2003

* cited by examiner

*Primary Examiner*—Samir A. Ahmed
*Assistant Examiner*—John W Lee
(74) *Attorney, Agent, or Firm*—Sughrue Mion, PLLC

(57) ABSTRACT

Voting of coordinates of each pixel in a photographic image onto a Hough space corresponding to annuluses is performed, the Hough space being defined by a coordinate system having an X coordinate axis for a circle center point, a Y coordinate axis for a circle center point, and an r coordinate axis for a radial direction. A vote value of each voting position having coordinates (X, Y, r) on the Hough space is acquired as a first integrated vote value from a calculation of a number of votes given to each voting position. A position represented by (X, Y) coordinate values of a voting position associated with the largest first integrated vote value is detected as the position of the center point of the circular pattern.

30 Claims, 13 Drawing Sheets

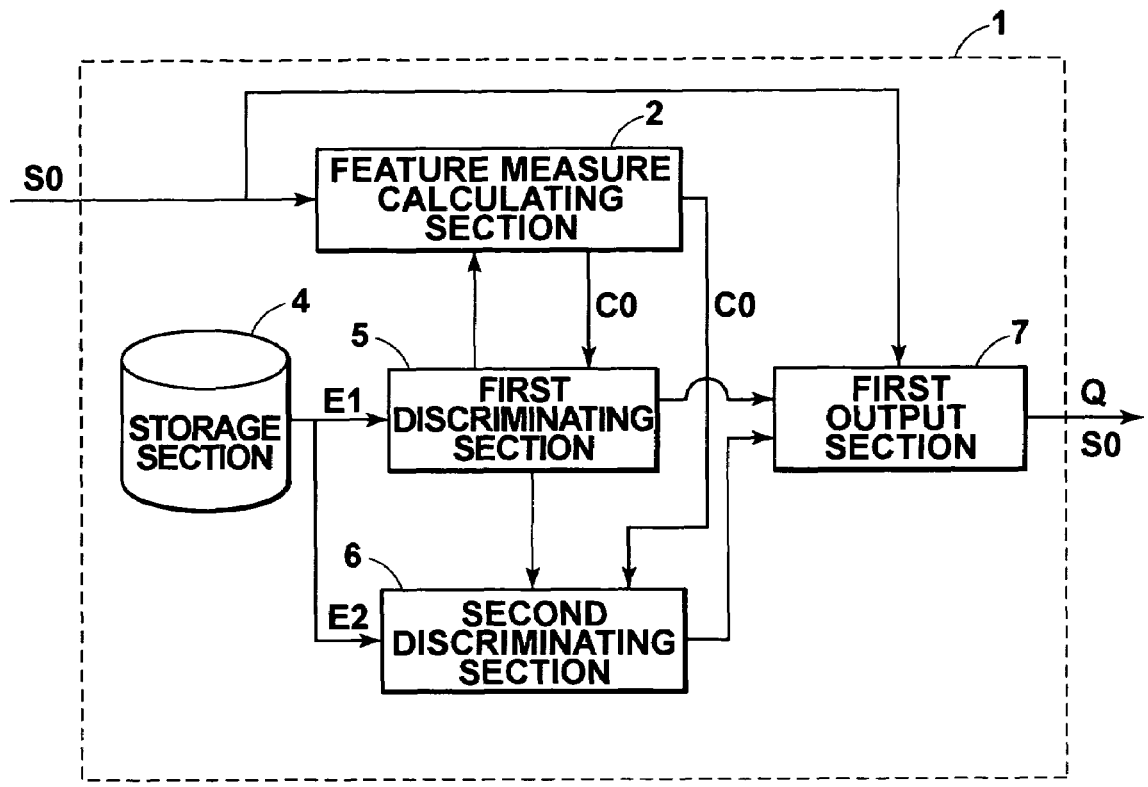
FIG.2
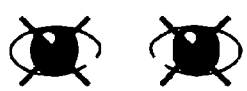
FIG.3A
FIG.3B
| 1 | 1 | 1 |
|---|---|---|
| 0 | 0 | 0 |
| -1 | -1 | -1 |
FIG.4A
| 1 | 0 | -1 |
|---|---|---|
| 1 | 0 | -1 |
| 1 | 0 | -1 |
FIG.4B

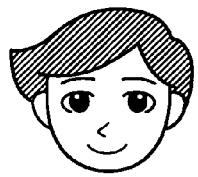 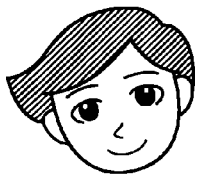 
FIG.10A   FIG.10B   FIG.10C
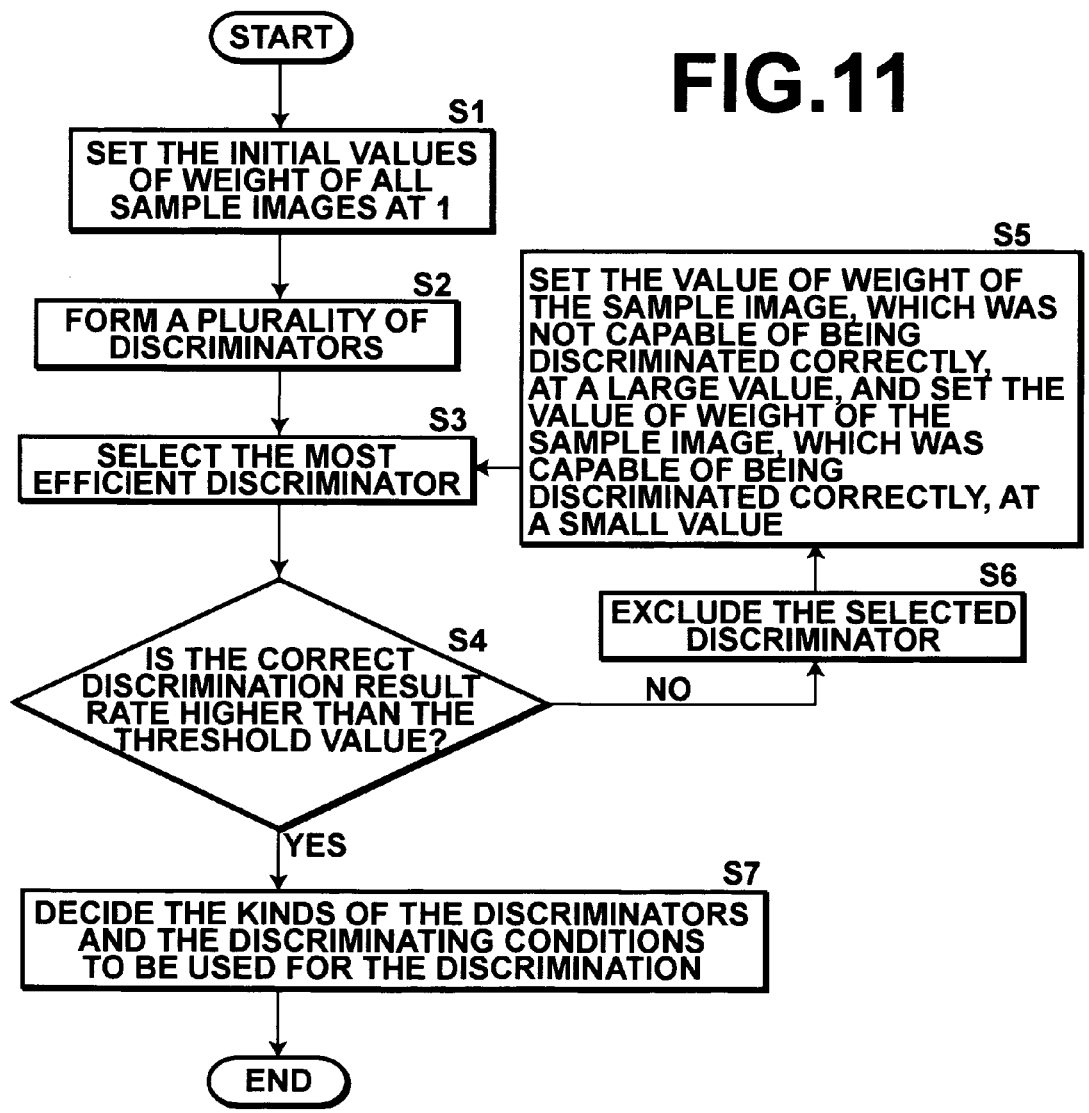
FIG.11

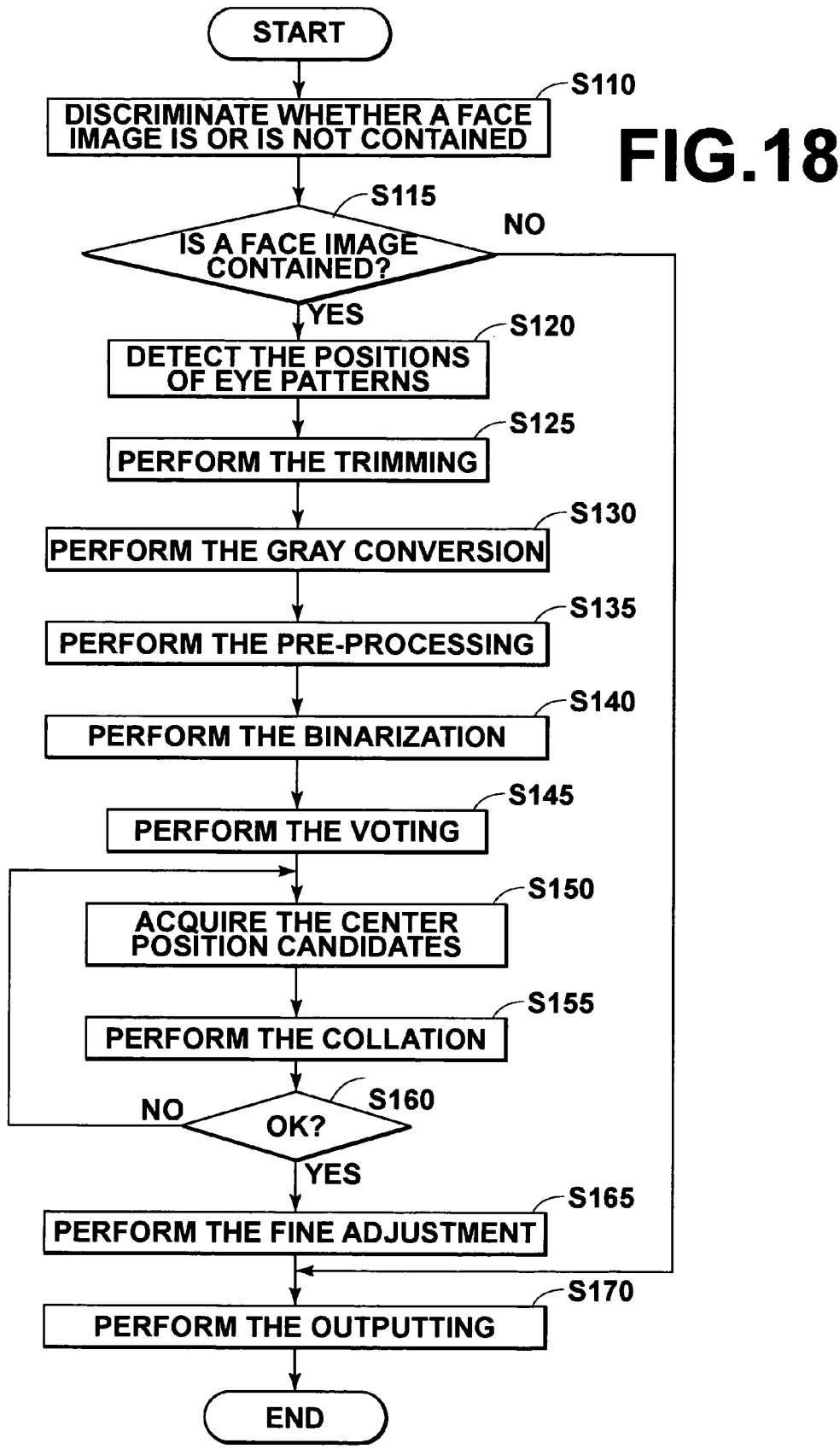

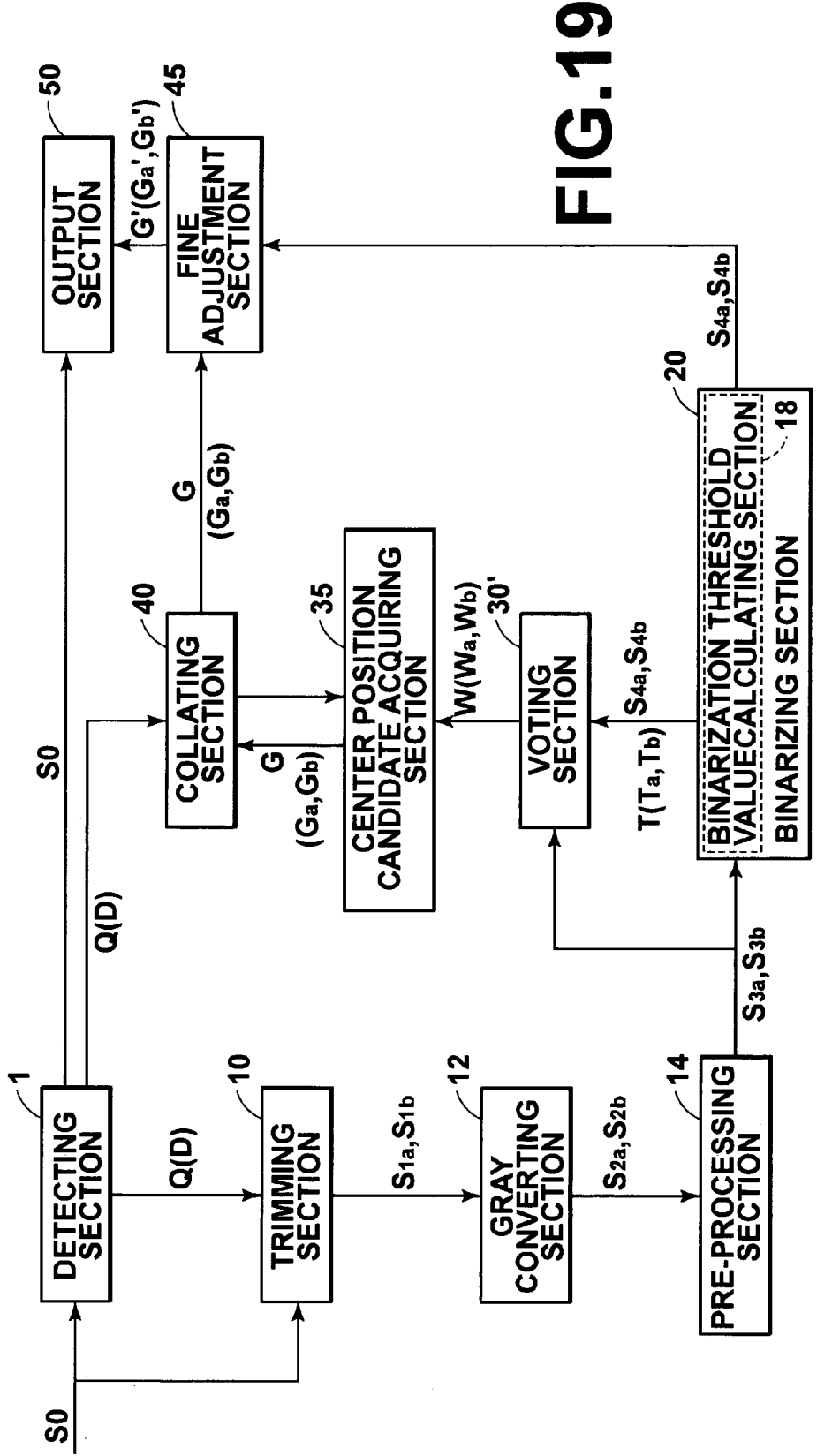

METHOD AND APPARATUS FOR DETECTING POSITIONS OF CENTER POINTS OF CIRCULAR PATTERNS

BACKGROUND OF THE INVENTION

1. Field of the Invention

This invention relates to a method and apparatus for detecting a position of a center point of a circular pattern, such as a pupil pattern, from a digital photographic image. This invention also relates to a computer program for causing a computer to execute the method of detecting a position of a center point of a circular pattern.

2. Description of the Related Art

Operations for detecting positions of center points of circular patterns from digital photographic images have heretofore been performed in various fields, such as detection of positions of center points of circular patterns of circular mechanical parts and detection of positions of center points of pupil patterns in photographic images of faces. Heretofore, various techniques, such as template matching techniques and Hough transform techniques, have been utilized for detecting circular patterns from digital photographic images of objects. Of the techniques described above, the Hough transform techniques have been utilized as techniques capable of detecting incomplete circular patterns, such as circular patterns having breakages due to noise, and pupil patterns in which only partial areas of pupils are illustrated due to eye shutting. (The Hough transform techniques are described in, for example, Japanese Unexamined Patent Publication No. 2003-70742.) Specifically, with the Hough transform techniques described above, a digital photographic image is subjected to binarization processing, and an edge is detected from a binary image having been obtained from the binarization processing. Also, by use of data on pixels corresponding to the detected edge, voting is performed on a Hough space corresponding to three parameters (i.e., an X coordinate of a center point of a circle, a Y coordinate of the center point of the circle, and a radius r) for the detection of an annulus. Thereafter, coordinates, which have received the largest number of votes as a result of the voting, are acquired, and values of the three parameters for annuluses are calculated in accordance with the thus acquired coordinates. Further, the annulus center coordinate values (X, Y) having thus been calculated are taken as the coordinate values of the center point of the circular pattern to be detected. In this manner, the position of the center point of the circular pattern is detected.

The aforesaid techniques for detecting the position of the center point of the circular pattern with the Hough transform have large effects of detecting the circular patterns having breakages and the positions of the center points of the circular patterns having breakages. However, with the aforesaid techniques for detecting the position of the center point of the circular pattern with the Hough transform, only the data on the pixels corresponding to edges in the digital photographic images are utilized. Therefore, the aforesaid techniques for detecting the position of the center point of the circular pattern with the Hough transform have the problems in that the aforesaid techniques are apt to be adversely affected by noise.

SUMMARY OF THE INVENTION

The primary object of the present invention is to provide a method of detecting a position of a center point of a circular pattern, which method is capable of detecting a position of a center point of a circular pattern having a breakage and is free from adverse effects of noise.

Another object of the present invention is to provide an apparatus for carrying out the method of detecting a position of a center point of a circular pattern.

A further object of the present invention is to provide a computer program for causing a computer to execute the method of detecting a position of a center point of a circular pattern.

The present invention provides a first method of detecting a position of a center point of a circular pattern, in which a position of a center point of a circular pattern contained in a photographic image is detected from the photographic image, the method comprising the steps of:

i) performing voting of coordinates of each of pixels in the photographic image onto a Hough space corresponding to annuluses, which Hough space is defined by a coordinate system having an X coordinate axis for a center point of a circle, a Y coordinate axis for a center point of a circle, and an r coordinate axis for a radial direction, ii) acquiring a vote value of each of voting positions having coordinates (X, Y, r) on the Hough space from a calculation of a number of votes having been given to each of the voting positions having the coordinates (X, Y, r) on the Hough space, the thus acquired vote value being taken as a first integrated vote value, a plurality of first integrated vote values being obtained with respect to the voting positions having the coordinates (X, Y, r) on the Hough space, and iii) detecting a position, which is represented by (X, Y) coordinate values of a voting position associated with the largest first integrated vote value among the plurality of the first integrated vote values having been obtained with respect to the voting positions having the coordinates (X, Y, r) on the Hough space, as the position of the center point of the circular pattern.

Specifically, with the first method of detecting a position of a center point of a circular pattern in accordance with the present invention, in lieu of a technique for detecting a position of a center point of a circular pattern being performed wherein voting is performed on the Hough space corresponding to annuluses by use of only the pixels corresponding to an edge and wherein an annulus is found from a voting position associated with the largest vote value, the circular pattern is processed as a plurality of concentric annuluses, and the voting on the Hough space corresponding to annuluses is performed by use of data on all of the pixels in the photographic image to be processed. From the voting operation, the plurality of the vote values (i.e, the first integrated vote values) are obtained with respect to the voting positions having the coordinates (X, Y, r) on the Hough space. Also, the position, which is represented by the (X, Y) coordinate values of the voting position associated with the largest first integrated vote value among the plurality of the first integrated vote values having been obtained with respect to the voting positions having the coordinates (X, Y, r) on the Hough space, is detected as the position of the center point of the circular pattern. The first method of detecting a position of a center point of a circular pattern in accordance with the present invention is based upon the findings that, since a plurality of concentric annuluses have their circle center points at an identical position (though they vary in radius), the voting position having the (X, Y) coordinate values corresponding to the position of the circle center points will receive the largest number of votes.

The present invention also provides a second method of detecting a position of a center point of a circular pattern, in which a position of a center point of a circular pattern contained in a photographic image is detected from the photographic image, the method comprising the steps of:

i) performing voting of coordinates of each of pixels in the photographic image onto a Hough space corresponding to annuluses, which Hough space is defined by a coordinate system having an X coordinate axis for a center point of a circle, a Y coordinate axis for a center point of a circle, and an r coordinate axis for a radial direction, ii) acquiring a vote value of each of voting positions having coordinates (X, Y, r) on the Hough space from a calculation of a number of votes having been given to each of the voting positions having the coordinates (X, Y, r) on the Hough space, a plurality of vote values being obtained with respect to the voting positions having the coordinates (X, Y, r) on the Hough space, iii) adding the vote values of voting positions, which have identical (X, Y) coordinate values on the Hough space among the voting positions having the coordinates (X, Y, r) on the Hough space, to one another, a second integrated vote value being obtained from the addition and with respect to the voting positions, which have the identical (X, Y) coordinate values on the Hough space, a plurality of second integrated vote values being obtained with respect to the voting positions having the coordinates (X, Y, r) on the Hough space, and iv) detecting a position, which is represented by (X, Y) coordinate values corresponding to the largest second integrated vote value among the plurality of the second integrated vote values having been obtained with respect to the voting positions having the coordinates (X, Y, r) on the Hough space, as the position of the center point of the circular pattern.

Specifically, with the second method of detecting a position of a center point of a circular pattern in accordance with the present invention, in lieu of a technique for detecting a position of a center point of a circular pattern being performed wherein voting is performed on the Hough space corresponding to annuluses by use of only the data on the pixels corresponding to an edge and wherein an annulus is found from a voting position associated with the largest vote value, the circular pattern is processed as a plurality of concentric annuluses, and the voting on the Hough space corresponding to annuluses is performed by use of the data on all of the pixels in the photographic image to be processed. From the voting operation, the plurality of the vote values are obtained with respect to the voting positions having the coordinates (X, Y, r) on the Hough space. Also, the vote values of the voting positions, which have the identical (X, Y) coordinate values on the Hough space among the voting positions having the coordinates (X, Y, r) on the Hough space, are added to one another. (Since the voting positions described above have the identical (X, Y) coordinate values on the Hough space, concentric circles having different radiuses are constituted.) The second integrated vote value is obtained from the addition and with respect to the voting positions, which have the identical (X, Y) coordinate values on the Hough space, and the plurality of the second integrated vote values are obtained with respect to the voting positions having the coordinates (X, Y, r) on the Hough space. Further, the position, which is represented by the (X, Y) coordinate values corresponding to the largest second integrated vote value among the plurality of the second integrated vote values having been obtained with respect to the voting positions having the coordinates (X, Y, r) on the Hough space, is detected as the position of the center point of the circular pattern.

The second method of detecting a position of a center point of a circular pattern in accordance with the present invention should preferably be modified such that only the vote values of voting positions falling within a range of a radius of the circular pattern, which voting positions are among the voting positions having the identical (X, Y) coordinate values on the Hough space, are added to one another, and the second integrated vote value is obtained from the addition.

There is possibility that, besides the circular pattern whose center point is to be detected, other circular patterns will also be contained in the photographic image. Therefore, in cases where the range of the value of the radius of the circular pattern whose center point is to be detected is known, the second integrated vote value should preferably be obtained from the addition of only the vote values of voting positions falling within the range of the radius of the circular pattern whose center point is to be detected. In such cases, there is a strong probability that the position of the center point of the circular pattern having been detected from the photographic image, which contains a plurality of circular patterns, will represent the position of the center point of the circular pattern to be detected.

The range of the radius of the circular pattern may be the range defined between a lower limit value and an upper limit value. Alternatively, the range of the radius of the circular pattern may be the range defined by only a lower limit value. As another alternative, the range of the radius of the circular pattern may be the range defined by only an upper limit value.

Each of the first and second methods of detecting a position of a center point of a circular pattern in accordance with the present invention may be modified such that the photographic image contains a pupil pattern, and the circular pattern is the pupil pattern.

Also, each of the first and second methods of detecting a position of a center point of a circular pattern in accordance with the present invention should preferably be modified such that, in cases where the position of the center point of the pupil pattern is to be detected, weighted addition is performed on the number of votes having been given by the pixels in the photographic image, such that the number of a vote given by a pixel having a high chromatic color degree is assigned with weight lighter than the weight assigned to the number of a vote given by a pixel having a low chromatic color degree, and a value having been obtained from the weighted addition is taken as the vote value.

As the chromatic color degree of a pixel, one of various parameters capable of representing a length of a distance, by which a color tone of the pixel is spaced away from a gray axis, may be employed. By way of example, the chromatic color degree of the pixel may be calculated with Formula (1) shown below.

$$U = (R-G)^2 + (G-B)^2 + (B-R)^2 \tag{1}$$

wherein U represents the chromatic color degree of the pixel, R represents the R value of the pixel, G represents the G value of the pixel, and B represents the B value of the pixel.

Specifically, in each of the first and second methods of detecting a position of a center point of a circular pattern in accordance with the present invention, in cases where a vote is given by one pixel with respect to one voting position (though one pixel casts a vote only one time with respect to one voting position), the voting value of the voting position may be taken to be 1. The number of votes having been given to each voting position may thus be calculated cumulatively, and the vote value of each voting position may thereby be acquired. (In such cases, the vote value of each voting position corresponds to the number of pixels which have given the votes to the voting position.) However, in the cases of a photographic image containing a pupil pattern, i.e. in the cases of a photographic image of a face, the chromatic color degree of the pupil pattern is lower than the chromatic color degree of the other image areas. Therefore, with the aforesaid modification of each of the first and second methods of detecting a position of a center point of a circular pattern in accordance with the present invention, in cases where the position of the center point of the pupil pattern is to be detected, the weighted addition is performed on the number of votes having been given by the pixels in the photographic image, such that the number of the vote given by the pixel having the high chromatic color degree is assigned with weight lighter than the weight assigned to the number of the vote given by the pixel having the low chromatic color degree, and the value having been obtained from the weighted addition is taken as the vote value of the voting position. In such cases, adverse effects of noise due to a spectacle color frame pattern, a colored hair pattern, a skin pattern, or the like, which is contained in the photographic image of the face, are capable of being suppressed, and more accurate detection results are capable of being obtained.

Each of the first and second methods of detecting a position of a center point of a circular pattern in accordance with the present invention is applicable to gray level photographic images and color photographic images. In cases where the photographic image is a color photographic image, each of the first and second methods of detecting a position of a center point of a circular pattern in accordance with the present invention may be modified such that the photographic image, which is a color photographic image, is converted into a gray level photographic image, and the voting is performed by use of the gray level photographic image.

In cases where the voting is to be performed by use of a gray level photographic image or a gray level photographic image obtained from gray conversion of a color photographic image, each of the first and second methods of detecting a position of a center point of a circular pattern in accordance with the present invention should preferably be modified such that the gray level photographic image is binarized by use of a predetermined threshold value, a binary image being obtained from the binarization, and the voting is performed by use of the binary image.

With the modification described above, processing is capable of being performed quickly, and a memory capacity necessary for operation processing for the detection is capable of being kept small.

The predetermined threshold value, which is used for the binarization of the gray level photographic image photographic image, should preferably be calculated in accordance with the number of pixels in the gray level photographic image and luminance of each of the pixels.

Further, each of the first and second methods of detecting a position of a center point of a circular pattern in accordance with the present invention should preferably be modified such that, in cases where the position of the center point of the pupil pattern is to be detected, weighted addition is performed on the number of votes having been given by the pixels in the photographic image, such that the number of a vote given by a pixel having a low luminance is assigned with weight heavier than the weight assigned to the number of a vote given by a pixel having a high luminance, and a value having been obtained from the weighted addition is taken as the vote value.

Specifically, in each of the first and second methods of detecting a position of a center point of a circular pattern in accordance with the present invention, in cases where a vote is given by one pixel with respect to one voting position (though one pixel casts a vote only one time with respect to one voting position), the voting value of the voting position may be taken to be 1. The number of votes having been given to each voting position may thus be calculated cumulatively, and the vote value of each voting position may thereby be acquired. (In such cases, the vote value of each voting position corresponds to the number of pixels which have given the votes to the voting position.) However, in cases where the vote value of each voting position is to be acquired with respect to a circular pattern, such as the pupil pattern, in which a pixel close to the center point of the circular pattern has a luminance lower than the luminance of a pixel remote from the center point of the circular pattern (i.e., has an image density higher than the image density of a pixel remote from the center point of the circular pattern), the vote value of each voting position should preferably be acquired with the weighted addition performed on the number of votes having been given by the pixels in the photographic image, such that the number of a vote given by a pixel having a low luminance to the voting position is assigned with weight heavier than the weight assigned to the number of a vote given by a pixel having a high luminance to the voting position (though one pixel casts a vote only one time with respect to one voting position).

Furthermore, each of the first and second methods of detecting a position of a center point of a circular pattern in accordance with the present invention may be modified such that a photographic image of a face is subjected to trimming, in which an outer frame is set in a region in the vicinity of an eye pattern, a trimming image being obtained from the trimming, and the trimming image is taken as the photographic image (containing the pupil pattern).

The present invention further provides a first apparatus for detecting a position of a center point of a circular pattern, in which a position of a center point of a circular pattern contained in a photographic image is detected from the photographic image, the apparatus comprising:

i) vote value acquiring means for:
performing voting of coordinates of each of pixels in the photographic image onto a Hough space corresponding to annuluses, which Hough space is defined by a coordinate system having an X coordinate axis for a center point of a circle, a Y coordinate axis for a center point of a circle, and an r coordinate axis for a radial direction, and acquiring a vote value of each of voting positions having coordinates (X, Y, r) on the Hough space from a calculation of a number of votes having been given to each of the voting positions having the coordinates (X, Y, r) on the Hough space, the thus acquired vote value being taken as a first integrated vote value, a plurality of first integrated vote values being obtained with respect to the voting positions having the coordinates (X, Y, r) on the Hough space, and ii) center position detecting means for detecting a position, which is represented by (X, Y) coordinate values of a voting position associated with the largest first integrated vote value among the plurality of the first integrated vote values having been obtained with respect to the voting positions having the coordinates (X, Y, r) on the Hough space, as the position of the center point of the circular pattern.

The present invention still further provides a second apparatus for detecting a position of a center point of a circular pattern, in which a position of a center point of a circular pattern contained in a photographic image is detected from the photographic image, the apparatus comprising:

i) vote value acquiring means for:
  performing voting of coordinates of each of pixels in the photographic image onto a Hough space corresponding to annuluses, which Hough space is defined by a coordinate system having an X coordinate axis for a center point of a circle, a Y coordinate axis for a center point of a circle, and an r coordinate axis for a radial direction, and
  acquiring a vote value of each of voting positions having coordinates (X, Y, r) on the Hough space from a calculation of a number of votes having been given to each of the voting positions having the coordinates (X, Y, r) on the Hough space, a plurality of vote values being obtained with respect to the voting positions having the coordinates (X, Y, r) on the Hough space,
ii) vote value integrating means for adding the vote values of voting positions, which have identical (X, Y) coordinate values on the Hough space among the voting positions having the coordinates (X, Y, r) on the Hough space, to one another, a second integrated vote value being obtained from the addition and with respect to the voting positions, which have the identical (X, Y) coordinate values on the Hough space, a plurality of second integrated vote values being obtained with respect to the voting positions having the coordinates (X, Y, r) on the Hough space, and
iii) center position detecting means for detecting a position, which is represented by (X, Y) coordinate values corresponding to the largest second integrated vote value among the plurality of the second integrated vote values having been obtained with respect to the voting positions having the coordinates (X, Y, r) on the Hough space, as the position of the center point of the circular pattern.

The second apparatus for detecting a position of a center point of a circular pattern in accordance with the present invention should preferably be modified such that the vote value integrating means adds only the vote values of voting positions falling within a range of a radius of the circular pattern, which voting positions are among the voting positions having the identical (X, Y) coordinate values on the Hough space, to one another, and the second integrated vote value is obtained from the addition.

Each of the first and second apparatuses for detecting a position of a center point of a circular pattern in accordance with the present invention may be modified such that the photographic image contains a pupil pattern, and
  the circular pattern is the pupil pattern.

Also, each of the first and second apparatuses for detecting a position of a center point of a circular pattern in accordance with the present invention should preferably be modified such that, in cases where the position of the center point of the pupil pattern is to be detected, the vote value acquiring means performs weighted addition on the number of votes having been given by the pixels in the photographic image, such that the number of a vote given by a pixel having a high chromatic color degree is assigned with weight lighter than the weight assigned to the number of a vote given by a pixel having a low chromatic color degree, and
  the vote value acquiring means takes a value, which has been obtained from the weighted addition, as the vote value.

Each of the first and second apparatuses for detecting a position of a center point of a circular pattern in accordance with the present invention is applicable to gray level photographic images and color photographic images. In cases where the photographic image is a color photographic image, each of the first and second apparatuses for detecting a position of a center point of a circular pattern in accordance with the present invention may be modified such that the apparatus further comprises image converting means for performing gray conversion of the photographic image, which is a color photographic image, in order to obtain a gray level photographic image, and
  the vote value acquiring means performs the voting by use of the gray level photographic image.

Further, each of the first and second apparatuses for detecting a position of a center point of a circular pattern in accordance with the present invention should preferably be modified such that the apparatus further comprises binarizing means for binarizing the gray level photographic image by use of a predetermined threshold value in order to obtain a binary image, and
  the vote value acquiring means performs the voting by use of the binary image.

Furthermore, each of the first and second apparatuses for detecting a position of a center point of a circular pattern in accordance with the present invention should preferably be modified such that, in cases where the position of the center point of the pupil pattern is to be detected, the vote value acquiring means performs weighted addition on the number of votes having been given by the pixels in the photographic image, such that the number of a vote given by a pixel having a low luminance is assigned with weight heavier than the weight assigned to the number of a vote given by a pixel having a high luminance, and
  the vote value acquiring means takes a value, which has been obtained from the weighted addition, as the vote value.

Also, each of the first and second apparatuses for detecting a position of a center point of a circular pattern in accordance with the present invention, in which the position of the center point of the pupil pattern is to be detected, may be modified such that the apparatus further comprises trimming means for:
  subjecting a photographic image of a face to trimming, in which an outer frame is set in a region in the vicinity of an eye pattern, in order to obtain a trimming image, and
  taking the trimming image as the photographic image.

In cases where the trimming is to be performed, the region in the vicinity of the eye pattern may be specified manually by the operator.

Alternatively, each of the first and second apparatuses for detecting a position of a center point of a circular pattern in accordance with the present invention may be modified such that the apparatus further comprises eye pattern position detecting means for:
  detecting a position of the eye pattern from the photographic image of the face, and
  feeding information, which represents the thus detected position of the eye pattern, into the trimming means.

The region in the vicinity of the eye pattern may be specified in accordance with the information, which represents the thus detected position of the eye pattern.

Also, each of the first and second apparatuses for detecting a position of a center point of a circular pattern in accordance with the present invention, in which the position of the center point of the pupil pattern is to be detected, should preferably be modified such that the apparatus further comprises collating means for:
  making a judgment as to whether the position of the center point of the pupil pattern, which position has been detected, is or is not correct, the judgment being made in accordance with a criterion in that a difference between a position of a center point of a left pupil pattern, which position has been detected by use of a trimming image of a left eye pattern, and a position of a center point of a right pupil pattern, which position has been detected by use of a trimming image of a right eye pattern, will fall within a predetermined range in accordance with a distance between the left eye pattern and the right eye pattern, obtaining the second largest integrated vote value that ranks next to the integrated vote value corresponding to the position of the center point of the pupil pattern, which position has been detected most recently, until the position of the center point of the pupil pattern, which position has been detected, is judged as being correct, and detecting a position, which is represented by (X, Y) coordinate values of a voting position associated with the second largest integrated vote value, as the position of the center point of the pupil pattern.

The term "integrated vote value" as used herein for the modification described above means the first integrated vote value (i.e., the vote value) described above or the second integrated vote value described above.

Ordinarily, as for the left eye pattern and the right eye pattern, which are contained in the same face image, the difference between the position of the left eye pattern and the position of the right eye pattern, which positions are taken with respect to the vertical direction, is slight. Since the pupil pattern is located within the eye pattern, the difference between the position of the center point of the left pupil pattern and the position of the center point of the right pupil pattern, which difference is taken with respect to the vertical direction, will fall within a slight difference range (e.g., a range of D/50 in cases where the distance between the left eye pattern and the right eye pattern corresponds to D number of pixels). Also, the difference between the position of the center point of the left pupil pattern and the position of the center point of the right pupil pattern, i.e. the distance between the positions of the center points of the two pupil patterns, is approximately equal to the distance (corresponding to D number of pixels) between the left eye pattern and the right eye pattern. Therefore, it may be regarded that the difference between the position of the center point of the left pupil pattern and the position of the center point of the right pupil pattern will fall within the range of, for example, 0.8×D to 1.2×D. In each of the first and second apparatuses for detecting a position of a center point of a circular pattern in accordance with the present invention, on the basis of the findings described above, the collating means makes the judgment as to whether the position of the center point of the pupil pattern, which position has been detected, is or is not correct. Specifically, the collating means makes the judgment in accordance with the criterion in that the difference between the position of the center point of the left pupil pattern, which is contained in a face image, and the position of the center point of the right pupil pattern, which is contained in the same face image, (i.e., the positions taken with respect to the vertical direction and/or the positions taken with respect to the horizontal direction) will fall with in the predetermined range in accordance with the positions of the left eye pattern and the right eye pattern.

The collating means obtains the second largest integrated vote value that ranks next to the integrated vote value corresponding to the position of the center point of the pupil pattern, which position has been detected most recently. In such cases, in lieu of the second largest integrated vote value being obtained from all of the integrated vote values, the collating means should preferably obtain the second largest integrated vote value from integrated vote values, each of which corresponds to (X, Y) coordinate values representing a position spaced at least a predetermined distance away from the position of the center point of the pupil pattern having been detected most recently.

Specifically, in cases where the position of the center point of the pupil pattern, which position has been detected most recently, is the position of the center point of a circular pattern (such as a naevus pattern located in the vicinity of the eye pattern) other than the pupil pattern, and it has been judged that the position of the center point of the pupil pattern, which position has been detected most recently, is not the true position of the center point of the pupil pattern (i.e., it has been judged that the position of the center point of the pupil pattern, which position has been detected most recently, is not correct), there is little possibility that the true position of the center point of the pupil pattern will be located in the vicinity of the position of the center point of the pupil pattern, which position has been detected most recently. Therefore, at the time at which the collating means obtains the second largest integrated vote value that ranks next to the integrated vote value corresponding to the position of the center point of the pupil pattern, which position has been detected most recently, in lieu of the second largest integrated vote value being obtained from all of the integrated vote values, the collating means should preferably obtain the second largest integrated vote value from integrated vote values, each of which corresponds to the (X, Y) coordinate values representing the position spaced at least the predetermined distance away from the position of the center point of the pupil pattern having been detected most recently. In such cases, the true position of the center point of the pupil pattern is capable of being obtained quickly.

Also, the predetermined distance described above should preferably be a value calculated in accordance with the distance between the two eye patterns in the same face image. By way of example, the predetermined distance described above may be a value of D/30, where D represents the number of pixels representing the distance between the two eye patterns in the same face image.

Further, each of the first and second apparatuses for detecting a position of a center point of a circular pattern in accordance with the present invention, in which the position of the center point of the pupil pattern is to be detected, should preferably be modified such that the apparatus further comprises pre-processing means for:

performing blank filling processing on the photographic image, and presenting the photographic image, which has been obtained from the blank filling processing, to the vote value acquiring means.

With each of the first and second apparatuses for detecting a position of a center point of a circular pattern in accordance with the present invention, which are provided with the trimming means for subjecting the photographic image of the face to the trimming and the image converting means for performing the gray conversion, the trimming may be performed after the gray conversion has been performed. Alternatively, such that the amount of calculations may be kept small and such that the processing may be performed quickly, the gray conversion should preferably be performed with the image converting means after the trimming has been performed with the trimming means.

The present invention also provides a first computer program for causing a computer to execute the first method of detecting a position of a center point of a circular pattern in accordance with the present invention and a second computer program for causing a computer to execute the second method of detecting a position of a center point of a circular pattern in accordance with the present invention.

With each of the first and second methods of detecting a position of a center point of a circular pattern, each of the first and second apparatuses for detecting a position of a center point of a circular pattern, and each of the first and second computer programs in accordance with the present invention, in which the position of the center point of the circular pattern contained in the photographic image is detected from the photographic image, the circular pattern is processed as a set of concentric annuluses, and the coordinates of each of all pixels in the photographic image are voted onto the Hough space corresponding to annuluses. Also, the vote value of each of the voting positions having coordinates (X, Y, r) on the Hough space is acquired as the first integrated vote value (the plurality of the first integrated vote values are obtained with respect to the voting positions having the coordinates (X, Y, r) on the Hough space), or the value obtained from the addition of the vote values of voting positions, which have the identical (X, Y) coordinate values on the Hough space among the voting positions having the coordinates (X, Y, r) on the Hough space, to one another is taken as the second integrated vote value (the plurality of the second integrated vote values are obtained with respect to the voting positions having the coordinates (X, Y, r) on the Hough space). Further, the position, which is represented by the (X, Y) coordinate values corresponding to the largest integrated vote value among the plurality of the integrated vote values having been obtained with respect to the voting positions having the coordinates (X, Y, r) on the Hough space, is detected as the position of the center point of the circular pattern. Therefore, it is possible to achieve efficient utilization of the advantages of the Hough transform in that the position of the center point of a circular pattern having breakages is capable of being detected. Also, adverse effects of noise are capable of being suppressed to be smaller than with the conventional techniques wherein only the pixels corresponding to an edge in the image are utilized. Accordingly, the position of the center point of the circular pattern is capable of being detected accurately.

Each of the second method of detecting a position of a center point of a circular pattern, the second apparatus for detecting a position of a center point of a circular pattern, and the second computer program in accordance with the present invention may be modified such that only the vote values of voting positions falling within the range of the radius of the circular pattern, which voting positions are among the voting positions having the identical (X, Y) coordinate values on the Hough space, are added to one another, and the second integrated vote value is obtained from the addition. With the modification described above, the probability that the position of the center point of the circular pattern to be detected will be detected reliably from the photographic image containing a plurality of circular patterns having different radiuses is capable of being kept high.

Also, each of the first and second methods of detecting a position of a center point of a circular pattern, each of the first and second apparatuses for detecting a position of a center point of a circular pattern, and each of the first and second computer programs in accordance with the present invention may be modified in the manner described below. Specifically, in cases where the position of the center point of the pupil pattern is to be detected from the photographic image of the face, by the utilization of the characteristics such that a pixel close to the center point of the pupil pattern has a luminance lower than the luminance of a pixel remote from the center point of the pupil pattern (i.e., has an image density higher than the image density of a pixel remote from the center point of the pupil pattern), the weighted addition is performed on the number of votes having been given by the pixels in the photographic image, such that the number of a vote given by a pixel having a low luminance is assigned with weight heavier than the weight assigned to the number of a vote given by a pixel having a high luminance, and a value having been obtained from the weighted addition is taken as the vote value. With the modification described above, the position of the center point of the pupil pattern is capable of being detected more accurately.

Further, each of the first and second apparatuses for detecting a position of a center point of a circular pattern in accordance with the present invention, in which the position of the center point of the pupil pattern is to be detected, may be modified such that the apparatus further comprises the collating means. The collating means makes the judgment as to whether the position of the center point of the pupil pattern, which position has been detected, is or is not correct, the judgment being made in accordance with the criterion in that the difference between the positions of the center points of the two pupil patterns contained in the same face image will fall within the predetermined range in accordance with the distance between the left eye pattern and the right eye pattern. Also, in cases where it has been judged that the position of the center point of the pupil pattern, which position has been detected, is not correct, the detection of the position of the center point of the pupil pattern is performed again. With the modification described above, the problems are capable of being prevented from occurring in that the position of the center point of a circular pattern (such as a naevus pattern located in the vicinity of the eye pattern) other than the pupil pattern is detected as the position of the center point of the pupil pattern. Therefore, the position of the center point of the pupil pattern is capable of being detected more accurately.

BRIEF DESCRIPTION OF THE DRAWINGS

FIG. 2 is a block diagram showing a detecting section 1 of the apparatus for detecting a position of a center point of a pupil pattern shown in FIG. 1, FIGS. 3A and 3B are explanatory views showing positions of the center points of eye patterns, FIG. 4A is an explanatory view showing a horizontal edge detecting filter, FIG. 4B is an explanatory view showing a vertical edge detecting filter, FIGS. 10A, 10B, and 10C are explanatory views showing rotation of a face image, FIG. 11 is a flow chart showing how a learning operation for formation of reference data is performed, FIG. 18 is a flow chart showing how processing is performed in the first embodiment of the apparatus for detecting a position of a center point of a pupil pattern in accordance with the present invention shown in FIG. 1, FIG. 19 is a block diagram showing a second embodiment of the apparatus for detecting a position of a center point of a pupil pattern in accordance with the present invention.

DESCRIPTION OF THE PREFERRED EMBODIMENTS

The present invention will hereinbelow be described in further detail with reference to the accompanying drawings.

Figure 1:
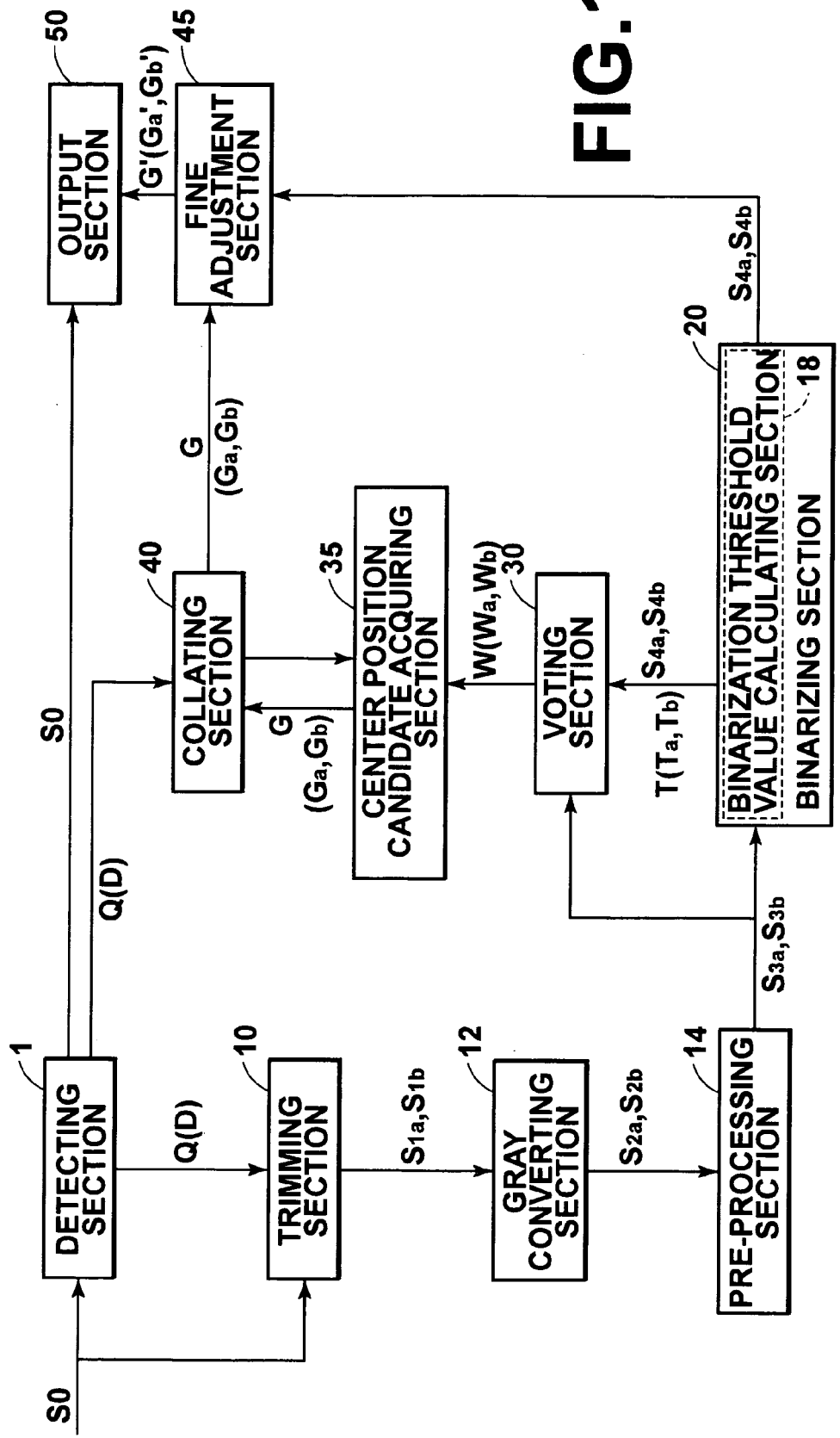
FIG. 1 is a block diagram showing a first embodiment of the apparatus for detecting a position of a center point of a circular pattern in accordance with the present invention, which apparatus is constituted as an apparatus for detecting a position of a center point of a pupil pattern.

FIG. 1 is a block diagram showing a first embodiment of the apparatus for detecting a position of a center point of a circular pattern in accordance with the present invention, which apparatus is constituted as an apparatus for detecting a position of a center point of a pupil pattern. With reference to FIG. 1, the first embodiment of the apparatus for detecting a position of a center point of a pupil pattern in accordance with the present invention comprises a detecting section 1 and a trimming section 10. The apparatus for detecting a position of a center point of a pupil pattern also comprises a gray converting section 12 and a pre-processing section 14. The apparatus for detecting a position of a center point of a pupil pattern further comprises a binarizing section 20 and a voting section 30. The apparatus for detecting a position of a center point of a pupil pattern still further comprises a center position candidate acquiring section 35 and a collating section 40. The apparatus for detecting a position of a center point of a pupil pattern also comprises a fine adjustment section 45 and an output section 50.

The detecting section 1 discriminates whether a face image is or is not contained in a photographic image S0. In cases where a face image is not contained in the photographic image S0, the detecting section 1 feeds an image signal representing the photographic image S0 into the output section 50. In cases where a face image is contained in the photographic image S0, the detecting section 1 detects a left eye pattern and a right eye pattern, which are contained in the face image, and feeds information Q, which contains information representing the positions of the left eye pattern and the right eye pattern and information representing a distance D between the left eye pattern and the right eye pattern, into the trimming section 10 and the collating section 40.

The trimming section 10 performs trimming on the photographic image S0 in accordance with the information Q having been received from the detecting section 1 and obtains a trimming image S1a, which contains the left eye pattern, and a trimming image S1b, which contains the right eye pattern. (In cases where discrimination between the trimming image S1a and the trimming image S1b need not be made in the explanation, each of the trimming image S1a and the trimming image S1b will hereinbelow be referred to as the trimming image S1.)

The gray converting section 12 performs gray conversion on the trimming image S1 and obtains a gray level image S2 of the trimming image S1 (i.e., each of a gray level image S2a of the trimming image S1a and a gray level image S2b of the trimming image S1b). The pre-processing section 14 performs pre-processing on the gray level image S2 and obtains a pre-processed image S3 (i.e., each of a pre-processed image S3a of the gray level image S2a and a pre-processed image S3b of the gray level image S2b).

The binarizing section 20 is provided with a binarization threshold value calculating section 18 for calculating a threshold value T, which is to be used for the binarization of the pre-processed image S3. The binarizing section 20 performs binarization processing on the pre-processed image S3 by use of the threshold value T, which has been calculated by the binarization threshold value calculating section 18, in order to obtain a binary image S4 (i.e., each of a binary image S4a of the pre-processed image S3a and a binary image S4b of the pre-processed image S3b).

The voting section 30 performs voting of coordinates of each of pixels in the binary image S4 onto a Hough space corresponding to annuluses and obtains a vote value given to each of voting positions. Also, the voting section 30 calculates an integrated vote value W (i.e., each of an integrated vote value Wa for the binary image S4a and an integrated vote value Wb for the binary image S4b) with respect to the voting positions, which have identical circle center coordinates on the Hough space. A plurality of integrated vote values W, W, . . . are obtained with respect to the voting positions having different circle center coordinates on the Hough space.

The center position candidate acquiring section 35 detects a position, which is represented by circle center coordinates corresponding to the largest integrated vote value W among the plurality of the integrated vote values W, W, . . . having been obtained from the voting section 30, as a center position candidate G (i.e., each of a center position candidate Ga and a center position candidate Gb). Also, in cases where an instruction for finding a next center position candidate G is given by the collating section 40, the center position candidate acquiring section 35 detect a next center position candidate G.

The collating section 40 makes a judgment as to whether the center position candidate G, which has been acquired by the center position candidate acquiring section 35, satisfies or does not satisfy collation criteria. In cases where it has been judged that the center position candidate G satisfies the collation criteria, the collating section 40 feeds out information, which represents the center position candidate G, as information, which represents the position of the center point of the pupil pattern, into the fine adjustment section 45. In cases where it has been judged that the center position candidate G does not satisfy the collation criteria, the collating section 40 gives the instruction for finding a next center position candidate G to the center position candidate acquiring section 35. The collating section 40 thus causes the center position candidate acquiring section 35 to iterate the operation for acquiring a center position candidate G until the center position candidate G having been acquired by the center position candidate acquiring section 35 satisfies the collation criteria.

The fine adjustment section 45 performs fine adjustment on a pupil pattern center position G (i.e., each of a pupil pattern center position Ga and a pupil pattern center position Gb), which has been acquired from the collating section 40. The fine adjustment section 45 feeds out information, which represents an ultimate center position G' (i.e., each of an ultimate center position Ga' and an ultimate center position Gb'), into the output section 50. In cases where the image signal representing the photographic image S0 (which does not contain a face image) is fed from the detecting section 1 into the output section 50, the output section 50 outputs the image signal representing the photographic image S0. Also, the output section 50 outputs the information, which represents the ultimate center position G' and has been received from the fine adjustment section 45.

The sections constituting the apparatus for detecting a position of a center point of a pupil pattern shown in FIG. 1 will hereinbelow be described in more detail.

Firstly, the detecting section 1 will be described in more detail.

FIG. 2 is a block diagram showing the detecting section 1. As illustrated in FIG. 2, the detecting section 1 comprises a feature measure calculating section 2 for calculating feature measures C0, C0, . . . from the photographic image S0. The detecting section 1 also comprises a storage section 4 for storing first reference data E1 and second reference data E2, which will be described later. The detecting section 1 further comprises a first discriminating section 5 for discriminating whether an image of a face of a person is or is not contained in the photographic image S0. The discrimination is made by the first discriminating section 5 in accordance with the feature measures C0, C0, . . . , which have been calculated by the feature measure calculating section 2, and the first reference data E1, which has been stored in the storage section 4. The detecting section 1 still further comprises a second discriminating section 6. In cases where it has been discriminated by the first discriminating section 5 that a face image is contained in the photographic image S0, the second discriminating section 6 discriminates the positions of the eye patterns, which are contained in the face image, in accordance with the feature measures C0, C0, . . . within the face image, which feature measures have been calculated by the feature measure calculating section 2, and the second reference data E2, which has been stored in the storage section 4. The detecting section 1 also comprises a first output section 7.

The position of each of the eye patterns, which position is discriminated by the detecting section 1, is the middle position between an outer canthus point and an inner canthus point in the face image. (The middle position between the outer canthus point and the inner canthus point in the face image is indicated by the "x" mark in each of FIGS. 3A and 3B.) As illustrated in FIG. 3A, in the cases of each of front-directed eye patterns, the middle position between the outer canthus point and the inner canthus point in the face image coincides with the position of the center point of the pupil pattern. Also, as illustrated in FIG. 3B, in the cases of each of rightward-directed eye patterns, the middle position between the outer canthus point and the inner canthus point in the face image does not coincide with the position of the center point of the pupil pattern and is located at a position shifted from the center point of the pupil pattern or at the region corresponding to the white of the eye.

The feature measure calculating section 2 calculates the feature measures C0, C0, . . . , which are to be used for the discrimination of a face image, from the photographic image S0. Also, in cases where it has been discriminated that a face image is contained in the photographic image S0, the feature measure calculating section 2 calculates the feature measures C0, C0, . . . from the face image, which has been extracted in the manner described later. Specifically, the feature measure calculating section 2 calculates a gradient vector (i.e., an orientation, in which the image density at each of pixels in the photographic image S0 or the face image varies, and a magnitude of the variation in image density at each of the pixels in each of the photographic image S0 and the face image) as the feature measure C0.

Figure 5:
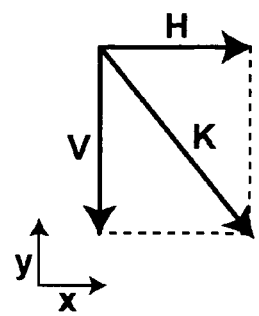
FIG. 5 is an explanatory view showing how a gradient vector is calculated.

How the gradient vector is calculated will be described hereinbelow. Firstly, the feature measure calculating section 2 performs filtering processing on the photographic image S0 by use of a horizontal edge detecting filter, which is illustrated in FIG. 4A, and detects a horizontal edge in the photographic image S0. Also, the feature measure calculating section 2 performs filtering processing on the photographic image S0 by use of a vertical edge detecting filter, which is illustrated in FIG. 4B, and detects a vertical edge in the photographic image S0. Further, as illustrated in FIG. 5, the feature measure calculating section 2 calculates a gradient vector K at each of the pixels in the photographic image S0 from a magnitude H of the horizontal edge at the pixel and a magnitude V of the vertical edge at the pixel. Furthermore, with respect to the face image, the feature measure calculating section 2 calculates the gradient vector K in the same manner as that for the photographic image S0. As will be described later, the feature measure calculating section 2 makes the calculation of the feature measures C0, C0, . . . at each of stages of deformation of the photographic image S0 and the face image.

Figure 6A:
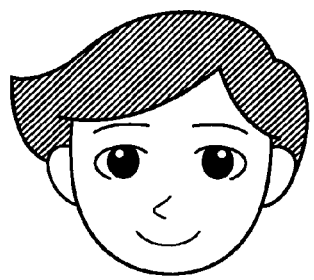
FIG. 6A is an explanatory view showing an image of a face of a person.
Figure 6B:
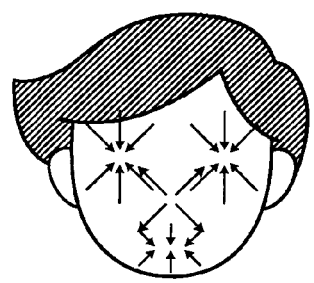
FIG. 6B is an explanatory view showing gradient vectors in the vicinity of eye patterns and a mouth pattern in the image of the face of the person shown in FIG. 6A.

As illustrated in FIG. 6B, in the cases of an image of a face of a person illustrated in FIG. 6A, the gradient vectors K, K, . . . , which have been calculated at the pixels corresponding to a pattern having a high image density (i.e., a dark pattern), such as each of eye patterns and a mouth pattern, have orientations heading toward the middle of the dark pattern. Also, the gradient vectors K, K, . . . , which have been calculated at the pixels corresponding to a pattern having a low image density (i.e., a bright pattern), such as a nose pattern, have orientations heading from the position of the bright pattern toward the outward side. Also, since the variation in image density at each of the eye patterns is larger than the variation in image density at the mouth pattern, the magnitudes of the gradient vectors K, K, . . . at each of the eye patterns become larger than the magnitudes of the gradient vectors K, K, . . . at the mouth pattern.

The orientation and the magnitude of the gradient vector K are taken as the feature measure C0. The orientation of the gradient vector K takes a value falling within the range of 0 degree to 359 degrees with a predetermined orientation of the gradient vector K (e.g., the orientation coinciding with the x direction in FIG. 5) being taken as a reference.

Figure 7A:
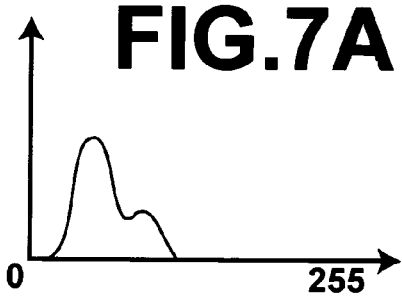
FIG. 7A is a graph showing a histogram of magnitudes of gradient vectors before being normalized.
Figure 7B:
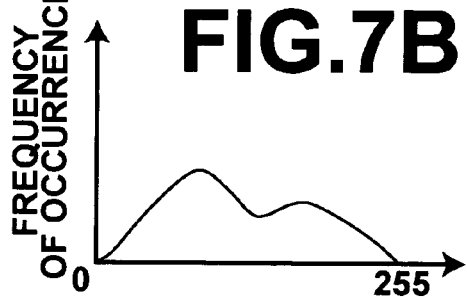
FIG. 7B is a graph showing a histogram of magnitudes of gradient vectors after being normalized.
Figure 7C:
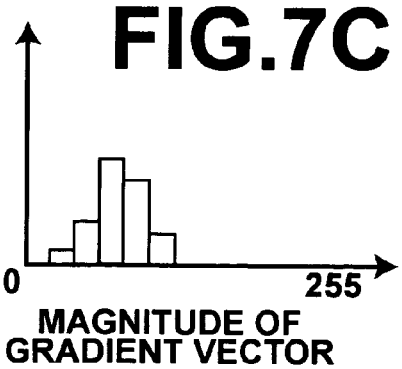
FIG. 7C is a graph showing a histogram of magnitudes of gradient vectors before being normalized, in which a range of distribution of the magnitudes of the gradient vectors has been divided into five sub-ranges.
Figure 7D:
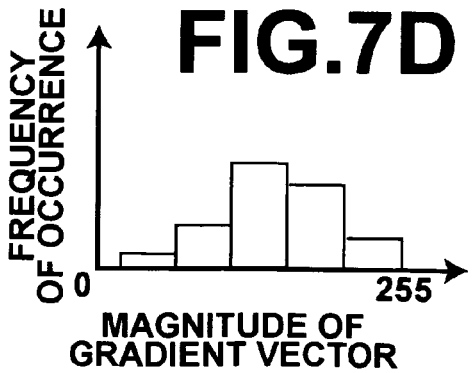
FIG. 7D is a graph showing a histogram of magnitudes of gradient vectors after being normalized, in which a range of distribution of the magnitudes of the gradient vectors has been divided into five sub-ranges.

The magnitudes of the gradient vectors K, K, . . . are normalized. The normalization is performed in the manner described below. Specifically, a histogram of the magnitudes of the gradient vectors K, K, . . . at all pixels in the photographic image S0 is formed. Also, the histogram is smoothed such that the magnitudes of the gradient vectors K, K, . . . at all pixels in the photographic image S0 may be distributed uniformly over values which the pixels in the photographic image S0 are capable of taking (e.g., over the values of 0 to 255 in the cases of 8 bits). In this manner, the magnitudes of the gradient vectors K, K, . . . are corrected. For example, in cases where the magnitudes of the gradient vectors K, K, . . . are small, and the histogram has the distribution as illustrated in FIG. 7A, in which the magnitudes of the gradient vectors K, K, . . . are biased toward the small magnitude side, the magnitudes of the gradient vectors K, K, . . . are normalized such that the magnitudes of the gradient vectors K, K, . . . may be distributed over the entire range of 0 to 255 as in a histogram illustrated in FIG. 7B. In order for the amount of operation processing to be kept small, as illustrated in FIG. 7C, the distribution range in the histogram of the magnitudes of the gradient vectors K, K, . . . should preferably be divided into, for example, five sub-ranges. Also, normalization should preferably be performed such that the five sub-ranges, into which the distribution of the frequency of occurrence has been divided as illustrated in FIG. 7C, may be distributed over five sub-ranges, into which the range of the values of 0 to 255 has been divided as illustrated in FIG. 7D.

Each of the first reference data E1 and the second reference data E2, which are stored in the storage section 4, specifies discriminating conditions with respect to combinations of the feature measures C0, C0, . . . at pixels constituting each of multiple kinds of pixel groups, each of which pixel groups is constituted of a combination of a plurality of pixels having been selected from each of sample images described later.

The combinations of the feature measures C0, C0, . . . at pixels constituting each pixel group and the discriminating conditions, which are specified by each of the first reference data E1 and the second reference data E2, are determined previously with learning operations performed on a sample image group that is constituted of a plurality of sample images, which are known as being face images, and a plurality of sample images, which are known as being images other than face images.

Figure 8A:
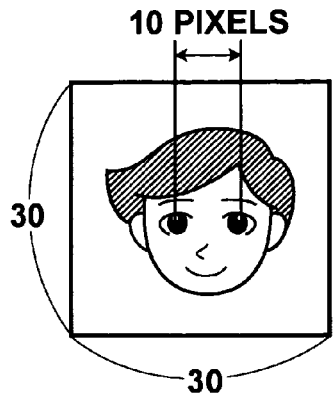
FIGS. 8A to 8I are explanatory views showing examples of sample images, which have been known as being face images and are utilized for a learning operation for formation of first reference data.
Figure 8D:
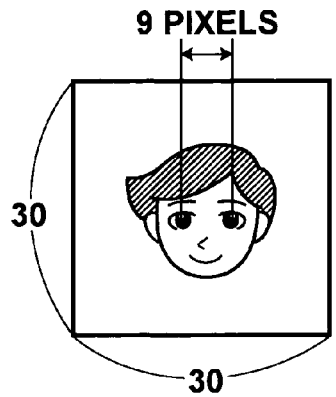
Figure 8G:
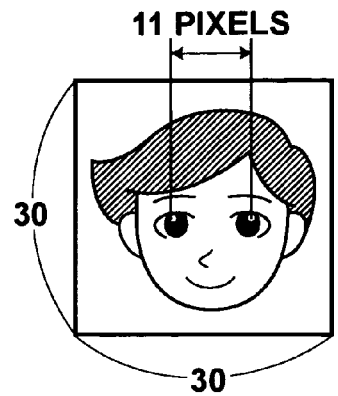
Figure 8B:
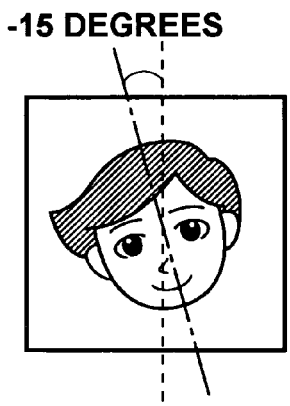
Figure 8E:
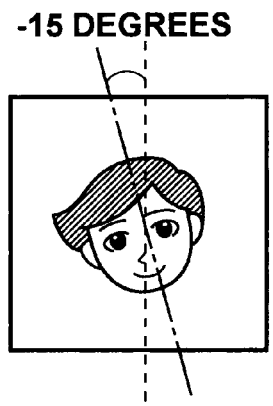
Figure 8H:
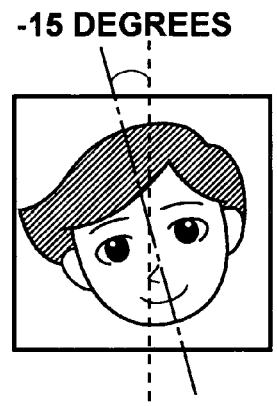
Figure 8C:
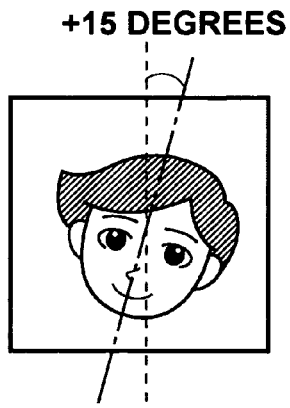
Figure 8F:
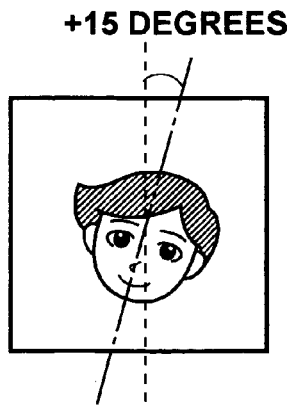
Figure 8I:
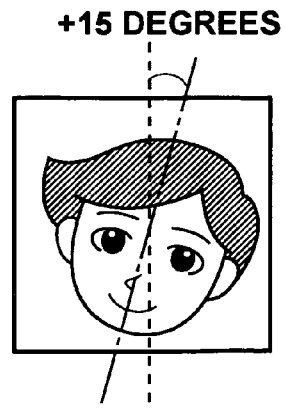

In this embodiment, in cases where the first reference data E1 is to be formed, as the sample images, which are known as being face images, the sample images having a size of 30×30 pixels are utilized. Specifically, as illustrated in FIGS. 8A to 8I, with respect to an image of one face, the sample images, in which the distance between the center points of the two eye patterns corresponds to 10 pixels (as illustrated in FIG. 8A), 9 pixels (as illustrated in FIG. 8D), and 11 pixels (as illustrated in FIG. 8G), are utilized. Also, each of the sample images illustrated in FIGS. 8A, 8D, and 8G, which are upright with respect to the distance between the center points of the two eye patterns, is rotated in stages in units of 3 degrees within the range of ±15 degrees in the plane (i.e., by rotation angles of −15 degrees, −12 degrees, −9 degrees, −6 degrees, −3 degrees, 0 degree, +3 degrees, +6 degrees, +9 degrees, +12 degrees, and +15 degrees). The thus rotated images are also utilized as the sample images. Therefore, as for the image of one face, 33 sample images (3×11=33) are prepared. In FIGS. 8A to 8I, for clearness, only the sample images rotated by angles of −15 degrees (as in FIGS. 8B, 8E, and 8H), 0 degree (as in FIGS. 8A, 8D, and 8G), and +15 degrees (as in FIGS. 8C, 8F, and 8I) are shown. Also, the center of the rotation coincides with the intersection point of diagonal lines of each sample image. As for the sample images in which the distance between the center points of the two eye patterns corresponds to 10 pixels, the positions of the center points of the eye patterns are identical in the sample images. The positions of the center points of the eye patterns are taken as having coordinates (x1, y1) and coordinates (x2, y2) on a coordinate system having its origin at the upper left corner of the sample image. The positions of the eye patterns with respect to the vertical direction (i.e., y1 and y2) are identical in all of the sample images.

Figure 9A:
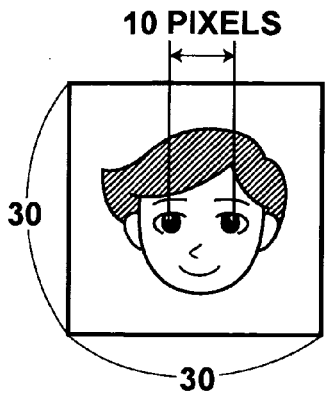
FIGS. 9A to 9I are explanatory views showing examples of sample images, which have been known as being face images and are utilized for a learning operation for formation of second reference data.
Figure 9D:
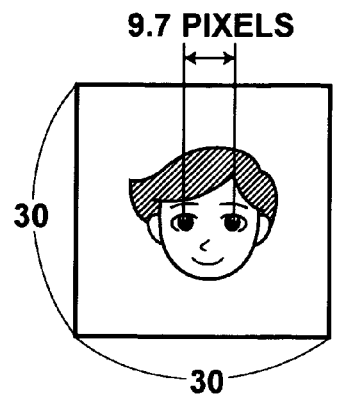
Figure 9G:
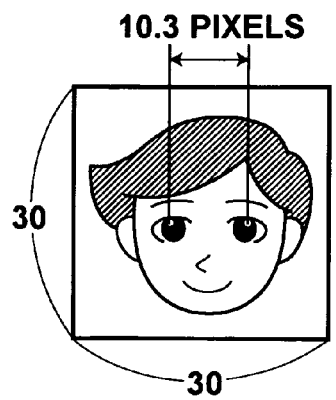
Figure 9B:
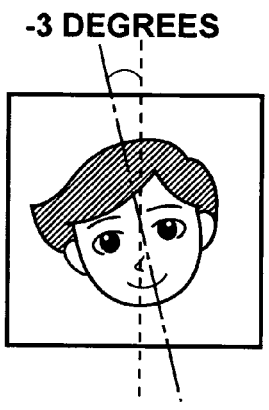
Figure 9E:
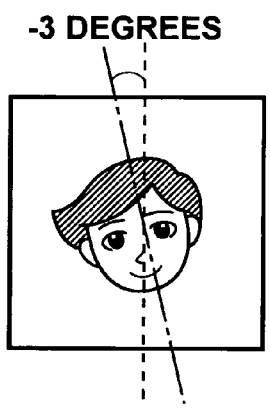
Figure 9H:
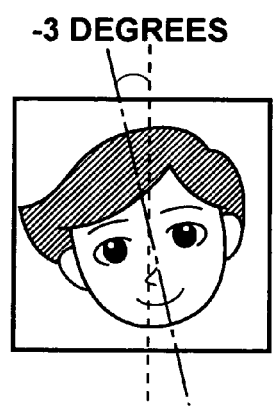
Figure 9C:
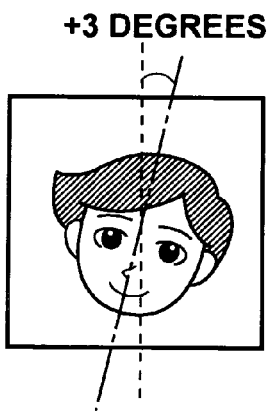
Figure 9F:
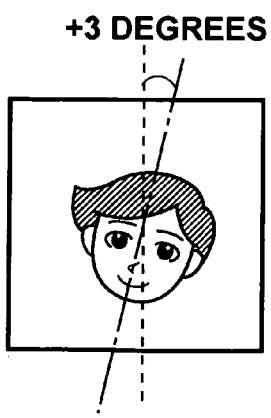
Figure 9I:
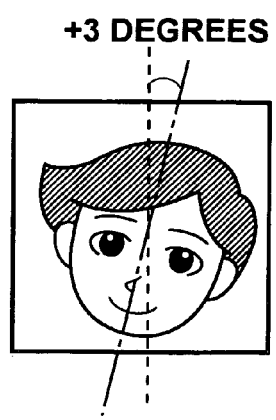

Also, in this embodiment, in cases where the second reference data E2 is to be formed, as the sample images, which are known as being face images, the sample images having a size of 30×30 pixels are utilized. Specifically, as illustrated in FIGS. 9A to 9I, with respect to an image of one face, the sample images, in which the distance between the center points of the two eye patterns corresponds to 10 pixels (as illustrated in FIG. 9A), 9.7 pixels (as illustrated in FIG. 9D), and 10.3 pixels (as illustrated in FIG. 9G), are utilized. Also, each of the sample images illustrated in FIGS. 9A, 9D, and 9G, which are upright with respect to the distance between the center points of the two eye patterns, is rotated in stages in units of 1 degree within the range of ±3 degrees in the plane (i.e., by rotation angles of −3 degrees, −2 degrees, −1 degree, 0 degree, +1 degrees, +2 degrees, and +3 degrees). The thus rotated images are also utilized as the sample images. Therefore, as for the image of one face, 21 sample images (3×7=21) are prepared. In FIGS. 9A to 9I, for clearness, only the sample images rotated by angles of −3 degrees (as in FIGS. 9B, 9E, and 9H), 0 degree (as in FIGS. 9A, 9D, and 9G), and +3 degrees (as in FIGS. 9C, 9F, and 9I) are shown. Also, the center of the rotation coincides with the intersection point of diagonal lines of each sample image. The positions of the eye patterns with respect to the vertical direction are identical in all of the sample images. In order for the distance between the center points of the two eye patterns to be altered to the distance corresponding to 9.7 pixels, the size of the sample image, in which the distance between the center points of the two eye patterns corresponds to 10 pixels, may be reduced to a size 9.7/10 times as large as the original size. Also, in order for the distance between the center points of the two eye patterns to be altered to the distance corresponding to 10.3 pixels, the size of the sample image, in which the distance between the center points of the two eye patterns corresponds to 10 pixels, may be enlarged to a size 10.3/10 times as large as the original size. The size of the sample image obtained from the image size enlargement or reduction processing may be set to be 30×30 pixels.

The positions of the center points of the eye patterns in the sample images, which are utilized for the learning operation for the formation of the second reference data E2, are taken as the positions of the eye patterns to be discriminated in this embodiment.

As the sample images, which are known as being images other than face images, arbitrary images having a size of 30×30 pixels are utilized.

In cases where learning operations are performed by use of only the images, in which the distance between the center points of the two eye patterns corresponds to 10 pixels, and in which the rotation angle in the plane is 0 degree (i.e., the face images are in the upright state), as the sample images, which are known as being face images, the images for which the presence of face images or the positions of eye patterns are capable of being discriminated by making reference to the first reference data E1 and the second reference data E2 are only the face images, in which the distance between the center points of the two eye patterns corresponds to 10 pixels and in which the rotation angle is 0 degree. A face image having the possibility of being contained in the photographic image S0 has one of various different sizes. Therefore, in cases where the discrimination is to be made as to whether a face image is or is not contained in the photographic image S0 or as to the positions of the eye patterns, the photographic image S0 is subjected to the image size enlargement or reduction processing as will be described later, such that the presence of the face image having a size adapted to the size of the sample image and the positions of the eye patterns are capable of being discriminated. However, in order for the distance between the center points of the two eye patterns to be accurately set at 10 pixels, it is necessary that the photographic image S0 is subjected to the image size enlargement or reduction processing, in which the enlargement scale factor is altered in stages in units of, for example, 1.1, and that the discrimination is made at each stage. In such cases, the amount of operation processing will become markedly large.

Besides a face image as illustrated in FIG. 10A, in which the rotation angle in the plane is 0 degree, it often occurs that the face image having the possibility of being contained in the photographic image S0 is a face image rotated as illustrated in FIG. 10B or FIG. 10C. However, in cases where the learning operations are performed by use of only the sample images, in which the distance between the center points of the two eye patterns corresponds to 10 pixels, and in which the rotation angle of the face image in the plane is 0 degree, the discrimination is not capable of being made with respect to the rotated face image as illustrated in FIG. 10B or FIG. 10C.

Therefore, in this embodiment, the learning operation for the formation of the first reference data E1 is performed by use of, as the sample images, which are known as being face images, the sample images as illustrated in FIGS. 8A to 8I, in which the distances between the center points of the two eye patterns correspond to 9 pixels, 10 pixels, and 11 pixels, and in which the face images associated with the aforesaid different distances between the center points of the two eye patterns are rotated in stages in units of 3 degrees within the range of ±15 degrees in the plane. In this manner, tolerance is imparted to the learning operation for the formation of the first reference data E1. Therefore, in cases where the discrimination is to be made by the first discriminating section 5 as will be described later, the photographic image S0 may be subjected to the image size enlargement or reduction processing, in which the enlargement scale factor is altered in stages in units of 11/9. Accordingly, with this embodiment, the time required to perform the operation processing is capable of being kept shorter than in the cases where the photographic image S0 is subjected to the image size enlargement or reduction processing, in which the enlargement scale factor is altered in stages in units of, for example, 1.1. Also, with this embodiment, the rotated image as illustrated in FIG. 10B or FIG. 10C is capable of being discriminated.

The learning operation for the formation of the second reference data E2 is performed by use of the sample images as illustrated in FIGS. 9A to 9I, in which the distances between the center points of the two eye patterns correspond to 9.7 pixels, 10 pixels, and 10.3 pixels, and in which the face images associated with the aforesaid different distances between the center points of the two eye patterns are rotated in stages in units of 1 degree within the range of ±3 degrees in the plane. Therefore, the tolerance of the learning operation for the formation of the second reference data E2 is smaller than the tolerance of the learning operation for the formation of the first reference data E1. Also, in cases where the discrimination is to be made by the second discriminating section 6 as will be described later, it is necessary for the photographic image S0 to subjected to the image size enlargement or reduction processing, in which the enlargement scale factor is altered in stages in units of 10.3/9.7. Accordingly, the time required to perform the operation processing for the discrimination in the second discriminating section 6 becomes longer than the time required to perform the operation processing for the discrimination in the first discriminating section 5. However, the patterns to be discriminated in the second discriminating section 6 are only the patterns contained in the face image having been discriminated by the first discriminating section 5. Therefore, the amount of operation processing for making the discrimination of the positions of the eye patterns is capable of being kept smaller than in cases where the entire area of the photographic image S0 is utilized.

FIG. 11 is a flow chart showing how a learning operation for formation of reference data is performed. An example of how the learning operation is performed on a sample image group will be described hereinbelow with reference to FIG. 11. By way of example, how the learning operation for the formation of the first reference data E1 is performed will be described hereinbelow.

The sample image group subjected to the learning operation is constituted of a plurality of sample images, which are known as being face images, and a plurality of sample images, which are known as being images other than face images. As described above, as the sample images, which are known as being face images, the sample images with respect to the image of one face, in which the distances between the center points of the two eye patterns correspond to 9 pixels, 10 pixels, and 11 pixels, and in which the face images associated with the aforesaid different distances between the center points of the two eye patterns are rotated in stages in units of 3 degrees within the range of ±15 degrees in the plane, are utilized. Weight, i.e. a degree of importance, is assigned to each of the sample images.

As illustrated in FIG. 11, firstly, in a step S1, the initial values of weight assigned to all of the sample images are equally set at 1.

Thereafter, in a step S2, a discriminator is formed with respect to each of multiple kinds of pixel groups, each of which pixel groups is constituted of a combination of a plurality of pixels having been selected from each of the sample images. The discriminator furnishes criteria for the discrimination between a face image and an image other than a face image by the utilization of combinations of the feature measures C0, C0, . . . at the pixels constituting one pixel group. In this embodiment, a histogram with respect to the combinations of the feature measures C0, C0, . . . at the pixels constituting one pixel group is utilized as the discriminator.

Figure 12:
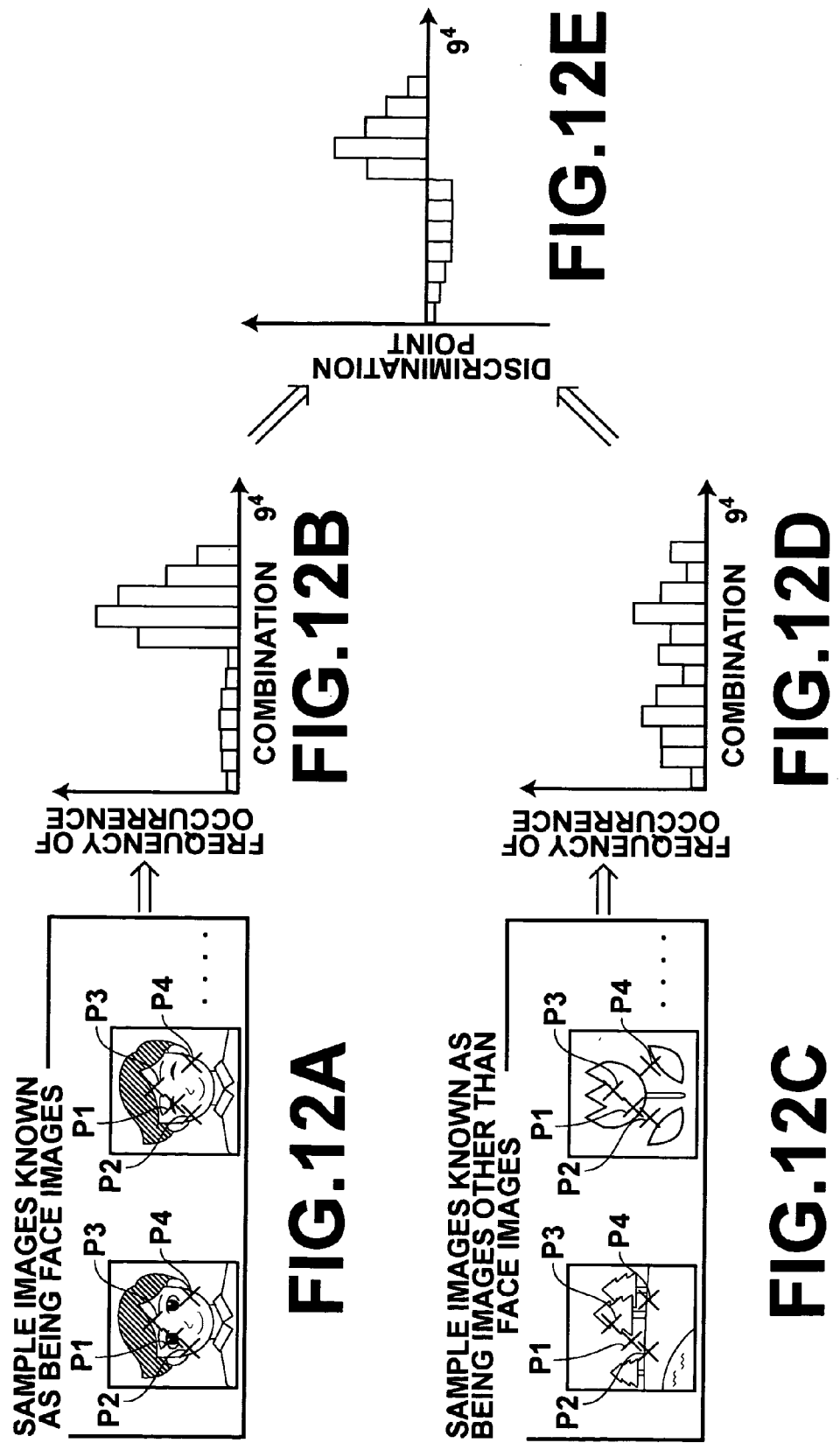
FIGS. 12A to 12E are explanatory views showing how a discriminator is formed.
Figure 13:
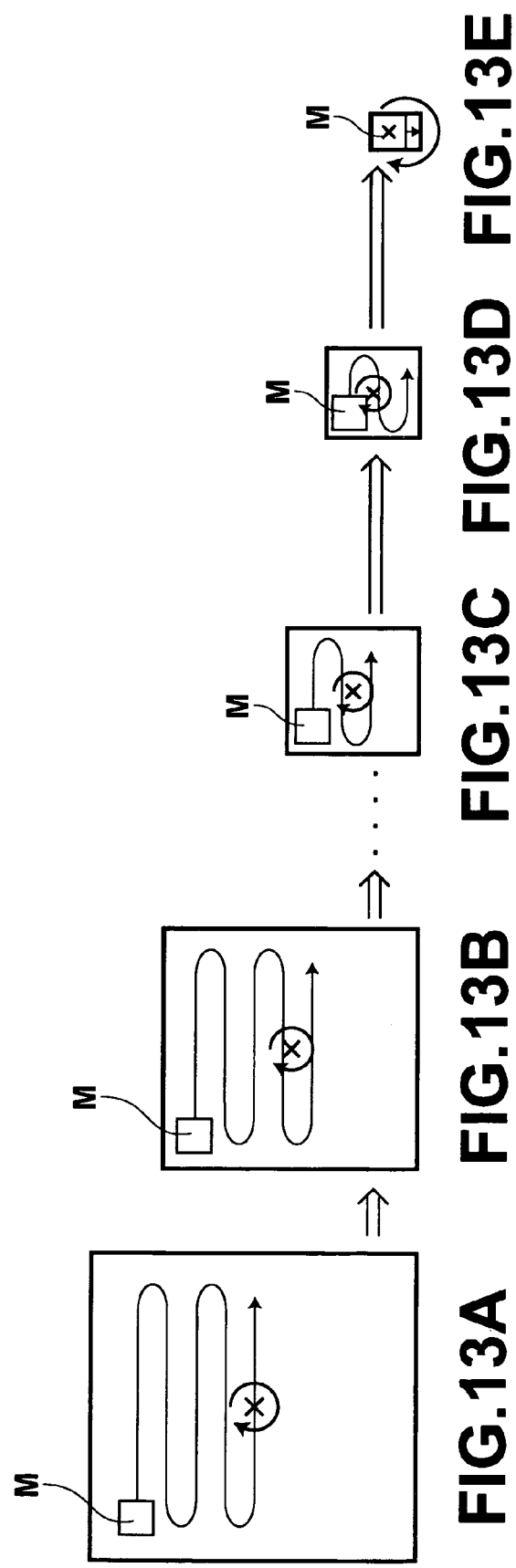
FIGS. 13A to 13E are explanatory views showing how an image to be discriminated is deformed in stages.

How a discriminator is formed will be described hereinbelow with reference to FIGS. 12A, 12B, 12C, 12D, and 12E. As indicated by the plurality of the sample images illustrated in FIG. 12A, which samples images are known as being face images, the pixels constituting each of the pixel groups to be utilized for the formation of the discriminator are composed of a pixel P1 located at the center point of the right eye pattern, a pixel P2 located at a right cheek pattern area, a pixel P3 located at a forehead pattern area, and a pixel P4 located at a left cheek pattern area in each of the plurality of the sample images, which are known as being face images. Also, with respect to all sample images, which are known as being face images, the combinations of the feature measures C0, C0, . . . at the pixels P1, P2, P3, and P4 are calculated. Further, as illustrated in FIG. 12B, the histogram of the combinations is formed. Each of the feature measures C0, C0, . . . represents the orientation and the magnitude of the gradient vector K. As the orientations of the gradient vectors K, K, ..., there are 360 (0 to 359) orientations. Also, as the magnitudes of the gradient vectors K, K, ..., there are 256 (0 to 255) magnitudes. If the 360 orientations and the 256 magnitudes of the gradient vectors K, K, ... are used directly, the number of the combinations per pixel will become equal to 360×256, and the number of the combinations with respect to the four pixels will become equal to $(360 \times 256)^4$. In such cases, a markedly large number of samples, a considerable time, and a markedly large memory capacity will be required to perform the learning operation and the detection. Therefore, in this embodiment, the orientations (0 to 359) of the gradient vectors K, K, ... are classified into the following four values: (a) a value of 0 (for the rightward orientations of 0 to 44 and 315 to 359), (b) a value of 1 (for the upward orientations of 45 to 134), (c) a value of 2 (for the leftward orientations of 135 to 224), and (d) a value of 3 (for the downward orientations of 225 to 314). Also, the magnitudes of the gradient vectors K, K, are classified into the following three values: (a) a value of 0, (b) a value of 1, and (c) a value of 2. Also, values of combinations are calculated with the formulas shown below.

Value of combination=0 (if magnitude of gradient vector=0)

Value of combination=(orientation of gradient vector+ 1)×magnitude of gradient vector (if magnitude of gradient vector>0)

As a result, the number of the combinations becomes equal to $9^4$. Therefore, the amount of the data of the feature measures C0, C0, ... is capable of being kept small.

In the same manner as that described above, with respect to the plurality of the sample images illustrated in FIG. 12C, which are known as being images other than face images, a histogram illustrated in FIG. 12D is formed. As for the sample images, which are known as being images other than face images, pixels corresponding to the positions of the aforesaid pixels P1, P2, P3, and P4 in each of the sample images, which are known as being face images, are utilized.

Thereafter, logarithms of ratios between the values of the frequencies of occurrence represented by the histogram shown in FIG. 12B and the values of the frequencies of occurrence represented by the histogram shown in FIG. 12D are taken and represented by a histogram. In this manner, as illustrated in FIG. 12E, the histogram to be utilized as the discriminator is obtained. Values on the vertical axis of the histogram utilized as the discriminator are hereinbelow referred to as the discrimination points. With this discriminator, it may be regarded that an image representing a distribution of the feature measures C0, C0, ..., which distribution corresponds to a positive discrimination point, has a high possibility of being a face image, and that the level of the possibility of being a face image becomes high in cases where the absolute value of the discrimination point is large. Also, it may be regarded that an image representing a distribution of the feature measures C0, C0, ..., which distribution corresponds to a negative discrimination point, has a high possibility of not being a face image, and that the level of the possibility of not being a face image becomes high in cases where the absolute value of the discrimination point is large.

In the aforesaid step S2, a plurality of discriminators taking on the form of the histograms are formed with respect to the combinations of the feature measures C0, C0, ... at the pixels constituting the multiple kinds of the pixel groups, which have the possibility of being utilized for the discrimination.

Thereafter, in a step S3, a discriminator, which is most efficient for making the discrimination as to whether an image is or is not a face image, is selected from the plurality of the discriminators having been formed in the step S2. The selection of the most efficient discriminator is made with the weight of each sample image being taken into consideration. In this embodiment, weighted correct discrimination result rates of the discriminators are compared with one another, and a discriminator associated with the highest weighted correct discrimination result rate is selected. Specifically, at a first stage of the step S3, since the values of weight of the sample images are equally set at 1, a discriminator associated with the largest number of the sample images, which are capable of being accurately discriminated with the discriminator as being or as not being face images, is selected as the most efficient discriminator. At a second stage of the step S3 after the values of weight of the sample images have been updated in a step S5 described later, there is a sample image assigned with a value of weight of 1, a sample image assigned with a value of weight larger than 1, and a sample image assigned with a value of weight smaller than 1. During the evaluation of the correct discrimination result rate, the sample image assigned with a value of weight larger than 1 gets a large score in accordance with the large weight value than the sample image assigned with a value of weight of 1. Therefore, at a second stage of the step S3 and the stages that follow, importance is attached to the discrimination in which the sample image assigned with a large value of weight is discriminated correctly than the sample image assigned with a small value of weight is.

Thereafter, in a step S4, a judgment is made as to whether the correct discrimination result rate obtained with the combination of the discriminators having been selected is or is not higher than a threshold value. The correct discrimination result rate obtained with the combination of the discriminators having been selected is the rate, with which the results of discrimination made by use of the combination of the discriminators having been selected and as to whether the sample images are or are not face images coincide with correct solutions representing whether the sample images are or are not face images. The evaluation of the correct discrimination result rate obtained with the combination of the discriminators having been selected may be made by use of the sample image groups, which have been assigned with values of weight most recently, or the sample image groups, which have been assigned with an identical value of weight. In cases where it has been judged in the step S4 that the correct discrimination result rate obtained with the combination of the discriminators having been selected is higher than the threshold value, since the discrimination as to whether an image is or is not a face image is capable of being made with a sufficiently high probability by use of the discriminators having been selected, the learning operation is completed. In cases where it has been judged in the step S4 that the correct discrimination result rate obtained with the combination of the discriminators having been selected is not higher than the threshold value, such that an additional discriminator to be used in combination with the discriminators having been selected may be selected, the processing proceeds to a step S6.

In the step S6, such that the discriminator having been selected at the most recent stage of the step S3 may not be selected again, the discriminator having been selected at the most recent stage of the step S3 is excluded.

Thereafter, in the step S5, the value of weight assigned to the sample image, which was not capable of being correctly discriminated as being or as not being a face image by use of the discriminator having been selected at the most recent stage of the step S3, is altered to a large value. Also, the value of weight assigned to the sample image, which was capable of being correctly discriminated as being or as not being a face image, is altered to a small value. With the alteration of the value of weight described above, during the selection of a next discriminator, importance is attached to the image, which was not capable of being correctly discriminated by use of the already selected discriminator, such that a discriminator capable of correctly discriminating whether the image described above is or is not a face image may be selected. In this manner, the effects of the combination of the discriminators are enhanced.

The processing then reverts to the step S3, and a next efficient discriminator is selected with reference to the weighted correct discrimination result rate in the manner described above.

The processing in the step S3 to the step S6 is iterated, and the discriminators corresponding to the combinations of the feature measures C0, C0, . . . at the pixels constituting specific pixel groups are selected as the discriminators appropriate for the discrimination as to whether face images are or are not contained in the images. Also, in the step S4, it is judged that the correct discrimination result rate is higher than the threshold value. At this stage, in a step S7, the kinds of the discriminators and discriminating conditions to be used for the discrimination as to whether face images are or are not contained in the images are decided. At this stage, the learning operation for the formation of the first reference data E1 is completed.

Also, the learning operation for the formation of the second reference data E2 is performed by finding the kinds of the discriminators and discriminating conditions in the same manner as that described above.

In cases where the technique for the learning operation described above is employed, the discriminator need not necessarily be the discriminator taking on the form of the histogram and may be one of other kinds of discriminators, which are capable of furnishing criteria for the discrimination between a face image and an image other than a face image by the utilization of combinations of the feature measures C0, C0, . . . at the pixels constituting a specific pixel group. For example, the discriminator may be binary data, a threshold value, or a function. Also, as a discriminator taking on the form of a histogram, a histogram representing the differences between the histogram illustrated in FIG. 12B and the histogram illustrated in FIG. 12D, or the like, may be employed.

Further, the technique for the learning operation is not limited to the technique described above and may be one of other machine learning techniques, such as a neural network technique.

The first discriminating section 5 makes reference to the discriminating conditions, which have been decided through the learning operation for the formation of the first reference data E1 with respect to all of the combinations of the feature measures C0, C0, . . . at pixels constituting the multiple kinds of the pixel groups. The first discriminating section 5 thus calculates the discrimination points with respect to the combinations of the feature measures C0, C0, . . . at the pixels constituting each pixel group. Also, in accordance with all of the discrimination points, the first discriminating section 5 makes the discrimination as to whether a face image is or is not contained in the photographic image S0. In such cases, the orientations of the gradient vectors K, K, . . . , which orientations act as the feature measure C0, are classified into four values, and the magnitudes of the gradient vectors K, K, . . . , which magnitudes act as the feature measure C0, are classified into five values. In this embodiment, all of the discrimination points are added to one another, and the discrimination is made in accordance with whether the total sum obtained from the addition takes a positive sign or a negative sign. For example, in cases where the total sum of the discrimination points takes a positive value, it is judged that a face image is contained in the photographic image S0. Also, in cases where the total sum of the discrimination points takes a negative value, it is judged that a face image is not contained in the photographic image S0. The discrimination made by the first discriminating section 5 as to whether a face image is or is not contained in the photographic image S0 will hereinbelow be referred to as the first discrimination.

As described above, the sample images have a size of 30×30 pixels. However, the photographic image S0 may have one of various different sizes. Also, in cases where a face image is contained in the photographic image S0, the rotation angle of the face image in the plane is not always equal to 0 degree. Therefore, as illustrated in FIGS. 13A to 13E, the first discriminating section 5 performs the image size enlargement or reduction processing in stages and on the photographic image S0 until the vertical image size or the horizontal image size becomes equal to 30 pixels. Also, the first discriminating section 5 performs image rotation in the plane and in stages by 360 degrees. (In FIGS. 13A to 13E, how the image size reduction processing is performed is illustrated.) Further, the first discriminating section 5 sets a mask M having a size of 30×30 pixels on the photographic image S0, which has been obtained from the image size enlargement or reduction processing in each stage. Furthermore, the first discriminating section 5 moves the mask M at intervals of one pixel on the photographic image S0, which has been obtained from the image size enlargement or reduction processing in each stage, and makes the discrimination as to whether the image within the mask M is or is not a face image. In this manner, the first discriminating section 5 makes the discrimination as to whether a face image is or is not contained in the photographic image S0.

As described above, during the learning operation for the formation of the first reference data E1, the sample images, in which the distances between the center points of the two eye patterns correspond to 9 pixels, 10 pixels, and 11 pixels, have been utilized. Therefore, in the image size enlargement or reduction processing performed on the photographic image S0, the enlargement scale factor may be set at 11/9. Also, during the learning operation for the formation of the first reference data E1, the sample images, in which the face images associated with the aforesaid different distances between the center points of the two eye patterns are rotated within the range of ±15 degrees in the plane, have been utilized. Therefore, the photographic image S0 may be rotated by 360 degrees in units of 30 degrees.

The feature measure calculating section 2 calculates the feature measures C0, C0, . . . at each of the stages of the deformation, i.e. the image size enlargement or reduction processing and the rotation, of the photographic image S0.

Also, in the first discriminating section 5, the discrimination as to whether a face image is or is not contained in the photographic image S0 is made at each of all stages of the image size enlargement or reduction processing and the rotation. In cases where it is once discriminated that a face image is contained in the image at a certain stage, it is discriminated that a face image is contained in the photographic image S0. From the photographic image S0 of the size and the rotation angle at the stage at which it has been discriminated that a face image is contained, a region of 30×30 pixels corresponding to the position of the mask M having been discriminated is extracted as the face image.

The second discriminating section 6 makes reference to the discriminating conditions, which have been decided through the learning operation for the formation of the second reference data E2 and with respect to all of the combinations of the feature measures C0, C0, . . . at the pixels constituting the multiple kinds of the pixel groups. The second discriminating section 6 thus calculates the discrimination points with respect to the combinations of the feature measures C0, C0, . . . at the pixels constituting each pixel group. Also, in accordance with all of the discrimination points, the second discriminating section 6 makes the discrimination as to the positions of the eye patterns contained in the face image. In such cases, the orientations of the gradient vectors K, K, . . . , which orientations act as the feature measure C0, are classified into four values, and the magnitudes of the gradient vectors K, K, . . . , which magnitudes act as the feature measure C0, are classified into five values.

The second discriminating section 6 performs the image size enlargement or reduction processing in stages and on the face image, which has been extracted by the first discriminating section 5. Also, the second discriminating section 6 performs image rotation in the plane and in stages by 360 degrees. Further, the second discriminating section 6 sets a mask M having a size of 30×30 pixels on the face image, which has been obtained from the image size enlargement or reduction processing in each stage. Furthermore, the second discriminating section 6 moves the mask M at intervals of one pixel on the face image, which has been obtained from the image size enlargement or reduction processing in each stage, and makes the discrimination as to whether the positions of the eye patterns contained in the image within the mask M.

As described above, during the learning operation for the formation of the second reference data E2, the sample images, in which the distances between the center points of the two eye patterns correspond to 9.7 pixels, 10 pixels, and 10.3 pixels, have been utilized. Therefore, in the image size enlargement or reduction processing performed on the face image, the enlargement scale factor may be set at 10.3/9.7. Also, during the learning operation for the formation of the second reference data E2, the sample images, in which the face images associated with the aforesaid different distances between the center points of the two eye patterns are rotated within the range of 13 degrees in the plane, have been utilized. Therefore, the face image may be rotated by 360 degrees in units of 6 degrees.

The feature measure calculating section 2 calculates the feature measures C0, C0, . . . at each of the stages of the deformation, i.e. the image size enlargement or reduction processing and the rotation, of the face image.

In this embodiment, at each of all stages of the deformation of the face image having been extracted, the discrimination points are added together. Also, on the face image falling within the mask M having a size of 30×30 pixels at the stage of the deformation, which stage is associated with the largest total sum of the discrimination points, a coordinate system having its origin at the upper left corner of the face image is set. Further, the positions on the face image, which positions correspond to the coordinates (x1, y1) and the coordinates (x2, y2) of the positions of the eye patterns in the sample image, are detected. The positions on the photographic image S0 before being deformed, which positions correspond to the positions having been detected on the face image in the manner described above, are discriminated as the positions of the eye patterns.

In cases where it has been discriminated by the first discriminating section 5 that a face image is not contained in the photographic image S0, the first output section 7 feeds out the image signal, which represents the photographic image S0, directly into the output section 50. Also, in cases where it has been discriminated by the first discriminating section 5 that a face image is contained in the photographic image S0, the first output section 7 calculates the distance D between the two eye patterns in accordance with the positions of the two eye patterns having been discriminated by the second discriminating section 6. Further, the first output section 7 feeds out the information Q, which contains the information representing the positions of the two eye patterns and the information representing the distance D between the two eye patterns, into the trimming section 10 and the collating section 40.

Figure 14:
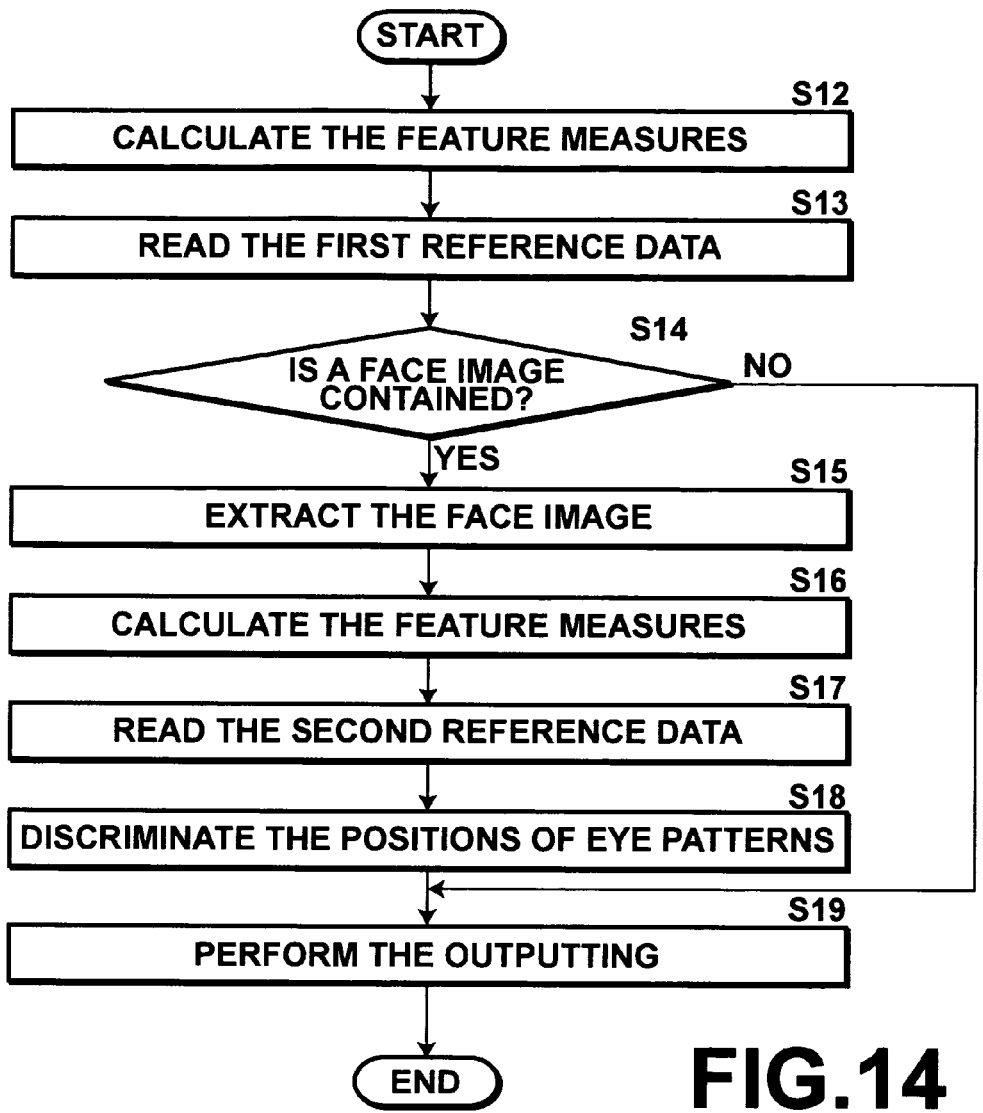
FIG. 14 is a flow chart showing how processing in the detecting section 1 is performed.

FIG. 14 is a flowchart showing how the processing in the detecting section 1 is performed in this embodiment.

As illustrated in FIG. 14, firstly, in a step S12, with respect to the photographic image S0, the feature measure calculating section 2 calculates the orientations and the magnitudes of the gradient vectors K, K, . . . in the photographic image S0 as the feature measures C0, C0, . . . at each of the stages of the image size enlargement or reduction processing and the rotation performed on the photographic image S0. In a step S13, the first discriminating section 5 reads the first reference data E1 from the storage section 4. Also, in a step S14, the first discriminating section 5 makes the first discrimination as to whether a face image is or is not contained in the photographic image S0.

In cases where it has been discriminated in the step S14 that a face image is contained in the photographic image S0, in a step S15, the first discriminating section 5 extracts the face image from the photographic image S0. In such cases, a plurality of face images may be extracted. Thereafter, in a step S16, at each of the stages of the image size enlargement or reduction processing and the rotation performed on the face image, the feature measure calculating section 2 calculates the orientations and the magnitudes of the gradient vectors K, K, . . . in the face image as the feature measures C0, C0, . . . Also, in a step S17, the second discriminating section 6 reads the second reference data E2 from the storage section 4. Further, in a step S18, the second discriminating section 6 performs the second discrimination as to the positions of the eye patterns contained in the face image.

Thereafter, in a step S19, the first output section 7 feeds out the information representing the positions of the two eye patterns having been discriminated from the photographic image S0 and the information representing the distance D between the two eye patterns, which distance has been calculated from the positions of the two eye patterns, as the information Q into the trimming section 10 and the collating section 40.

In cases where it has been discriminated in the step S14 that a face image is not contained in the photographic image S0, in a step S19, the first output section 7 feeds out the image signal, which represents the photographic image S0, directly into the output section 50.

Figure 15:
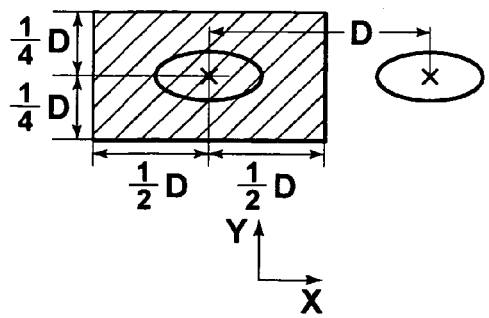
FIG. 15 is an explanatory view showing a range of trimming performed by a trimming section 10.

The trimming section 10 cuts out a predetermined region, which contains only the left eye pattern, and a predetermined region, which contains only the right eye pattern, in accordance with the information Q having been received from the detecting section 1. The trimming section 10 thus obtains the trimming image S1a and the trimming image S1b. The predetermined region in the trimming is the region surrounded by an outer frame, which is set in the vicinity of each eye pattern. For example, as indicated by the hatching in FIG. 15, the predetermined region in the trimming may be a rectangular region, which has its center point at the position of the eye pattern (i.e., the center point of the eye pattern) having been discriminated by the detecting section 1, and which has a length of D along the X direction in FIG. 15 and a length of 0.5D along the Y direction in FIG. 15. The region indicated by the hatching in FIG. 15 is the trimming region for the eye pattern on the left-hand side in FIG. 15. The trimming region for the eye pattern on the right-hand side in FIG. 15 is set in the same manner as that for the trimming region for the eye pattern on the left-hand side in FIG. 15.

The gray converting section 12 performs the gray conversion processing on the trimming image S1 having been obtained from the trimming section 10. The gray conversion processing is performed with Formula (2) shown below. The gray level image S2 is obtained from the gray conversion processing.

$$Y = 0.299 \times R + 0.587 \times G + 0.114 \times B \tag{2}$$

where Y represents the luminance value, R represents the R value, G represents the G value, and B represents the B value.

The pre-processing section 14 performs the pre-processing on the gray level image S2. In this embodiment, as the pre-processing, smoothing processing and blank filling processing are performed. The smoothing processing may be performed with, for example, processing utilizing a Gaussian filter. The blank filling processing may be performed with interpolation processing.

As illustrated in FIGS. 3A and 3B, at each of the pupil patterns in the photographic image, an upper area is apt to become brighter than a middle area. Therefore, the blank filling processing is performed, and image signal components corresponding to the upper area of the pupil pattern are inserted. In this manner, the accuracy with which the position of the center point of the pupil pattern is detected is capable of being enhanced.

The binarizing section 20 is provided with the binarization threshold value calculating section 18. By use of the threshold value T for the binarization having been calculated by the binarization threshold value calculating section 18, the binarizing section 20 performs the binarization on the pre-processed image S3, which has been obtained from the pre-processing section 14, in order to obtain the binary image S4. Specifically, the binarization threshold value calculating section 18 forms a histogram of luminance illustrated in FIG. 16 with respect to the pre-processed imageS3. Also, the binarization threshold value calculating section 18 calculates a luminance value corresponding to a frequency of occurrence, which corresponds to, e.g., 1/5 (20%) of the total number of the pixels in the pre-processed image S3, as the threshold value T for the binarization. The binarizing section 20 performs the binarization on the pre-processed image S3 by use of the threshold value T and obtains the binary image S4.

Figures 16, 17:
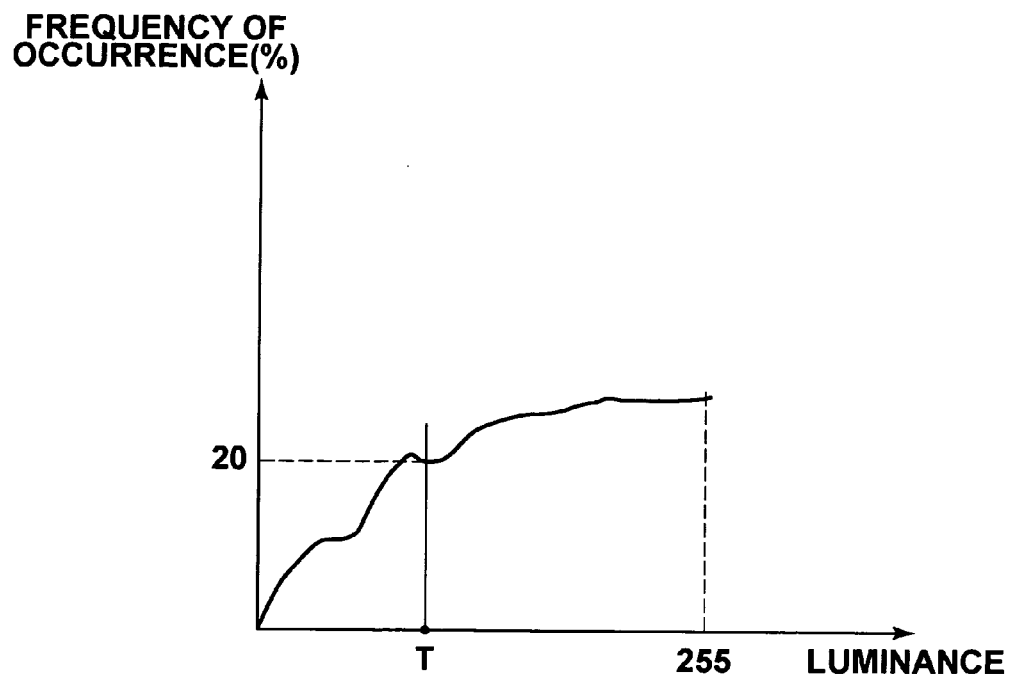
FIG. 16 is an explanatory graph showing how a threshold value for binarization is calculated.
FIG. 17 is an explanatory table showing weighting of vote values.

The voting section 30 firstly performs the voting of the coordinates of each of pixels (having a pixel value of 1) in the binary image S4 onto the Hough space corresponding to annuluses, which Hough space is defined by the coordinate system having the X coordinate axis for the center point of the circle, the Y coordinate axis for the center point of the circle, and the r coordinate axis for the radial direction. The voting section 30 calculates the vote value of each of voting positions having coordinates (X, Y, r) on the Hough space. A plurality of vote values are obtained with respect to the voting positions having the coordinates (X, Y, r) on the Hough space. Ordinarily, in cases where a vote is given by a certain pixel with respect to one voting position, a value of 1 may be added to the voting value of the voting position. The number of votes having been given to each voting position may thus be calculated cumulatively, and the vote value of each voting position may thereby be acquired. However, in this embodiment, in cases where a vote is given by a certain pixel with respect to one voting position, instead of a value of 1 being added to the vote value of the voting position, the vote value of the voting position is acquired in the manner described below. Specifically, reference is made to the luminance value of the certain pixel, which has given the vote with respect to the voting position, and the vote value of the voting position is acquired with the weighted addition performed on the number of votes having been given by the pixels in the binary image, such that the number of a vote given by a pixel having a low luminance to the voting position is assigned with weight heavier than the weight assigned to the number of a vote given by a pixel having a high luminance to the voting position. FIG. 17 is an explanatory table showing weight factors for vote values, which table is utilized in the voting section 30 of the embodiment of the apparatus for detecting a position of a center point of a pupil pattern illustrated in FIG. 1. In FIG. 17, T represents the threshold value T for the binarization, which has been calculated by the binarization threshold value calculating section 18.

In the manner described above, the voting section 30 calculates the plurality of the vote values with respect to the voting positions having the coordinates (X, Y, r) on the Hough space. Thereafter, the voting section 30 adds the vote values of voting positions, which have identical (X, Y) coordinate values on the Hough space among the voting positions having the coordinates (X, Y, r) on the Hough space, to one another. From the addition, the integrated vote value W is obtained with respect to the voting positions, which have the identical (X, Y) coordinate values on the Hough space. A plurality of integrated vote values W, W, . . . are obtained with respect to the voting positions having the coordinates (X, Y, r) on the Hough space. The voting section 30 feeds out information representing the integrated vote values W, W, . . . into the center position candidate acquiring section 35, such that it may be clear which integrated vote value W corresponds to which (X, Y) coordinate values on the Hough space.

The center position candidate acquiring section 35 detects a position, which is represented by the (X, Y) coordinate values corresponding to the largest integrated vote value W among the plurality of the integrated vote values W, W, . . . having been obtained from the voting section 30, as the center position candidate G of the pupil pattern. The center position candidate acquiring section 35 feeds out information, which represents the center position candidate G, into the collating section 40. In such cases, the center position candidate G having been acquired by the center position candidate acquiring section 35 includes the center position candidate Ga of the left pupil pattern and the center position candidate Gb of the right pupil pattern.

The collating section 40 performs the collation of the two center position candidates Ga and Gb in accordance with the distance D between the two eye patterns, which distance has been given by the detecting section 1.

Specifically, the collating section 40 performs the collation in accordance with the two collation criteria described below.

1. The difference between the Y coordinate value of the center point of the left pupil pattern and the Y coordinate value of the center point of the right pupil pattern should be at most D/50.

2. The difference between the X coordinate value of the center point of the left pupil pattern and the X coordinate value of the center point of the right pupil pattern should fall within the range of 0.8×D to 1.2×D.

The collating section 40 makes the discrimination as to whether the center position candidates Ga and Gb of the two pupil patterns having been given by the center position candidate acquiring section 35 satisfy or do not satisfy the two collation criteria described above. In cases where it has been discriminated that the center position candidates Ga and Gb of the two pupil patterns having been given by the center position candidate acquiring section 35 satisfy the two collation criteria, the collating section 40 feeds out the information, which represents the center position candidates Ga and Gb of the two pupil patterns, as the information, which represents the positions of the center points of the pupil patterns, into the fine adjustment section 45. In cases where it has been discriminated that the center position candidates Ga and Gb of the two pupil patterns having been given by the center position candidate acquiring section 35 do not satisfy at least either one of the two collation criteria, the collating section 40 gives the instruction for the acquisition of a next center position candidate G to the center position candidate acquiring section 35. Also, with respect to the next center position candidate G having been acquired by the center position candidate acquiring section 35, the collating section 40 performs the processing, such as the aforesaid collation, the outputting of the information representing the position of the center point of the pupil pattern (in cases where it has been discriminated that the collation criteria are satisfied), and the operation forgiving the instruction for the acquisition of a next center position candidate G to the center position candidate acquiring section 35 (in cases where it has been discriminated that at least either one of the collation criteria is not satisfied). The collating section 40 iterates the processing described above until the collation criteria are satisfied.

In cases where the instruction for the acquisition of a next center position candidate G is given from the collating section 40 to the center position candidate acquiring section 35, the center position candidate acquiring section 35 firstly fixes the position of the center point of one pupil pattern (in this case, the left pupil pattern). Also, in accordance with the integrated vote values W, W, . . . (in this case, the integrated vote values Wb, Wb, . . . ) with respect to the other pupil pattern (in this case, the right pupil pattern), the center position candidate acquiring section 35 acquires a position, which is represented by the (X, Y) coordinate values of a voting position satisfying the three conditions described below, as the next center position candidate G.

1. The voting position should be spaced by a distance of at least D/30 (where D represents the distance between the two eye patterns) from the position represented by the (X, Y) coordinate values of the center position candidate G, which has most recently been presented to the collating section 40.

2. The corresponding integrated vote value W should be the second largest integrated vote value that ranks next to the integrated vote value W corresponding to the (X, Y) coordinate values of the center position candidate G, which has most recently been presented to the collating section 40, among the integrated vote values W, W, . . . corresponding to the (X, Y) coordinate values satisfying the condition 1 described above.

3. The corresponding integrated vote value W should be at least 10% of the integrated vote value W (i.e., the largest integrated vote value W) corresponding to the (X, Y) coordinate values of the center position candidate G, which has firstly been presented to the collating section 40.

The center position candidate acquiring section 35 firstly fixes the position of the center point of the left pupil pattern and finds a center position candidate Gb of the right pupil pattern, which center position candidate Gb satisfies the three conditions described above, in accordance with the integrated vote values Wb, Wb, . . . having been obtained with respect to the right pupil pattern. In cases where a center position candidate Gb of the right pupil pattern, which center position candidate Gb satisfies the three conditions described above, is not capable of being found, the center position candidate acquiring section 35 fixes the position of the center point of the right pupil pattern and finds a center position candidate Ga of the left pupil pattern, which center position candidate Ga satisfies the three conditions described above, in accordance with the integrated vote values Wa, Wa, . . . having been obtained with respect to the left pupil pattern.

The fine adjustment section 45 performs the fine adjustment on the pupil pattern center position G (i.e., the center position candidate G satisfying the collation criteria), which has been presented by the collating section 40. Firstly, how the fine adjustment is performed on the center position Ga of the left pupil pattern will be described hereinbelow. With respect to the binary image S4a of the trimming image S1a of the left eye pattern, which binary image S4a has been obtained from the binarizing section 20, the fine adjustment section 45 iterates masking operation processing, in which a mask having a size of 9×9 and having values of 1 alone is utilized, three times. Also, in accordance with a position Gm of a pixel associated with the maximum result value having been obtained from the results of the masking operation processing, the fine adjustment section 45 performs the fine adjustment on the center position Ga of the left pupil pattern having been presented by the collating section 40. Specifically, for example, a mean position, which is obtained from the mean calculation of the position Gm and the center position candidate Ga of the left pupil pattern, may be taken as the ultimate center position Ga' of the left pupil pattern. Alternatively, a mean position obtained from the weighted mean calculation, in which weight is given to the center position Ga of the left pupil pattern, may be taken as the ultimate center position Ga' of the left pupil pattern. In this embodiment, the mean position obtained from the weighted mean calculation, in which weight is given to the center position Ga of the left pupil pattern, is taken as the ultimate center position Ga' of the left pupil pattern.

The fine adjustment on the center position Gb of the right pupil pattern is performed in the same manner as that described above by use of the binary image S4b of the trimming image S1b of the right eye pattern.

The fine adjustment section 45 performs the fine adjustment on the center positions Ga and Gb of the two pupil patterns, which have been given by the collating section 40, in the manner described above. Also, the fine adjustment section 45 feeds out the information, which represents the ultimate center position Ga' and the ultimate center position Gb' having been obtained from the fine adjustment, into the output section 50.

In cases where the photographic image S0, in which a face image is not contained, is received from the detecting section 1, the output section 50 feeds out the image signal, which represents the photographic image S0, together with identifying information, which represents that a face image is not contained in the photographic image S0, to a recording medium. The image signal and the corresponding identifying information are stored on the recording medium. Also, the output section 50 feeds out the information representing the ultimate center position G', which information has been received from the fine adjustment section 45, and the image signal, which represents the photographic image S0 corresponding to the ultimate center position G', to a recording medium. The information and the corresponding image signal are stored on the recording medium.

FIG. 18 is a flow chart showing how processing is performed in the first embodiment of the apparatus for detecting a position of a center point of a pupil pattern in accordance with the present invention shown in FIG. 1.

As illustrated in FIG. 18, firstly, in a step S110, the detecting section 1 performs the operation for detecting a face image fro the photographic image S0. Also, in a step S115, the detecting section makes the discrimination as to whether a face image is or is not contained in the photographic image S0. In cases where it has been discriminated in the step S115 that a face image is not contained in the photographic image S0, the image signal representing the photographic image S0 is fed out from the detecting section 1 into the output section 50. In cases where it has been discriminated in the step S115 that a face image is contained in the photographic image S0, in a step S120, the positions of the two eye patterns in the photographic image S0 are detected by the detecting section 1. Also, the information, which represents the positions of the two eye patterns, and the information, which represents the distance D between the two eye patterns, are fed out as the information Q into the trimming section 10. In a step S125, the trimming section 10 performs the trimming on the photographic image S0 in order to obtain the trimming image S1, i.e. each of the trimming image S1a, which contains only the left eye pattern, and the trimming image S1b, which contains only the right eye pattern. In a step S130, the trimming image S1 is subjected to the gray conversion performed by the gray converting section 12, and the gray level image S2 is obtained from the gray conversion. In a step S135, the gray level image S2 is subjected to the smoothing processing and the blank filling processing, which are performed by the pre-processing section 14, and the pre-processed image S3 is thereby obtained. Also, in a step S140, the pre-processed image S3 is subjected to the binarization performed by the binarizing section 20, and the binary image S4 is thereby obtained. Further, in a step S145, the voting section 30 performs the voting of the coordinates of each of the pixels in the binary image S4 onto the Hough space corresponding to annuluses. As a result, the integrated vote values W, W, ... corresponding to the (X, Y) coordinate values representing circle center points are obtained. In a step S150, the center position candidate acquiring section 35 presents the position, which corresponds to the (X, Y) coordinate values associated with the largest integrated vote value W, as the center position candidate G of the pupil pattern to the collating section 40. In a step S155, in accordance with the collation criteria described above, the collating section 40 performs the collation on the center position candidates Ga and Gb of the two pupil patterns having been given by the center position candidate acquiring section 35. In cases where it has been discriminated in a step S160 that the center position candidates Ga and Gb of the two pupil patterns satisfy the collation criteria, the collating section 40 feeds out the information, which represents the center position candidates Ga and Gb of the two pupil patterns, as the information, which represents the pupil pattern center positions, into the fine adjustment section 45. In cases where it has been discriminated in the step S160 that the center position candidates Ga and Gb of the two pupil patterns do not satisfy the collation criteria, the collating section 40 gives the instruction for the acquisition of the next center position candidate to the center position candidate acquiring section 35 (the step S150). The processing from the step S150 to the step S160 is iterated until it is discriminated by the collating section 40 that the center position candidate G having been given by the center position candidate acquiring section 35 satisfies the collation criteria.

In a step S165, the fine adjustment section 45 performs the fine adjustment on the center position G, which has been given from the collating section 40, in order to obtain the ultimate center position G'. The fine adjustment section 45 feeds the information, which represents the ultimate center position G', into the output section 50.

In cases where the photographic image S0, in which a face image is not contained, is received from the detecting section 1 (the step S115), the output section 50 feeds out the image signal, which represents the photographic image S0, together with the identifying information, which represents that a face image is not contained in the photographic image S0, to a recording medium. The image signal and the corresponding identifying information are stored on the recording medium. Also, the output section 50 feeds out the information representing the ultimate center position G', which information has been received from the fine adjustment section 45, and the image signal, which represents the photographic image S0 corresponding to the ultimate center position G', to a recording medium. The information and the corresponding image signal are stored on the recording medium.

As described above, with the first embodiment of the apparatus for detecting a position of a center point of a pupil pattern in accordance with the present invention, the pupil pattern acting as the circular pattern is processed as a set of concentric annuluses, and the coordinates of each of all pixels in the binary image S4 of the trimming image S1 are voted onto the Hough space corresponding to annuluses. Also, the value obtained from the addition of the vote values of the voting positions, which have the identical (X, Y) coordinate values on the Hough space among the voting positions having the coordinates (X, Y, r) on the Hough space, to one another is taken as the integrated vote value. (The plurality of the integrated vote values are obtained with respect to the voting positions having the coordinates (X, Y, r) on the Hough space.) Further, the position, which is represented by the (X, Y) coordinate values corresponding to the largest integrated vote value among the plurality of the integrated vote values having been obtained with respect to the voting positions having the coordinates (X, Y, r) on the Hough space, is detected as the position of the center point of the circular pattern. Therefore, it is possible to achieve efficient utilization of the advantages of the Hough transform in that the position of the center point of a circular pattern having breakages (for example, a pupil pattern in a photographic image of a person whose eye is shut, or a pupil pattern in a photographic image of a person whose forelock partially covers the eye) is capable of being detected. Also, adverse effects of noise are capable of being suppressed to be smaller than with the conventional techniques wherein only the pixels corresponding to an edge in the image are utilized. Accordingly, the position of the center point of the pupil pattern is capable of being detected accurately.

Also, with the first embodiment of the apparatus for detecting a position of a center point of a pupil pattern in accordance with the present invention, by the utilization of the characteristics such that a pixel close to the center point of the pupil pattern has a luminance lower than the luminance of a pixel remote from the center point of the pupil pattern (i.e., has an image density higher than the image density of a pixel remote from the center point of the pupil pattern), the weighted addition is performed on the number of votes having been given by the pixels in the binary image, such that the number of a vote given by a pixel having a low luminance is assigned with weight heavier than the weight assigned to the number of a vote given by a pixel having a high luminance, and a value having been obtained from the weighted addition is taken as the vote value. Therefore, the position of the center point of the pupil pattern is capable of being detected more accurately.

Further, the first embodiment of the apparatus for detecting a position of a center point of a pupil pattern in accordance with the present invention, is provided with the collating section 40. The collating section 40 makes the judgment as to whether the position of the center point of the pupil pattern, which position has been detected, is or is not correct, the judgment being made in accordance with the criterion in that the difference between the positions of the center points of the two pupil patterns contained in the same face image will fall within the predetermined range in accordance with the distance between the left eye pattern and the right eye pattern. Also, in cases where it has been judged that the position of the center point of the pupil pattern, which position has been detected, is not correct, the detection of the position of the center point of the pupil pattern is performed again. Therefore, with the first embodiment of the apparatus for detecting a position of a center point of a pupil pattern in accordance with the present invention, the problems are capable of being prevented from occurring in that the position of the center point of a circular pattern (such as a naevus pattern located in the vicinity of the eye pattern) other than the pupil pattern is detected as the position of the center point of the pupil pattern. Therefore, the position of the center point of the pupil pattern is capable of being detected more accurately.

Furthermore, with the first embodiment of the apparatus for detecting a position of a center point of a pupil pattern in accordance with the present invention, the characteristics in that only flesh color is present in the vicinity of the eye pattern, the trimming image obtained from the trimming, in which the outer frame is set in the vicinity of the eye pattern, is utilized for the detection of the pupil pattern. Therefore, the position of the center point of the pupil pattern is capable of being detected with a high detection rate.

FIG. 19 is a block diagram showing a second embodiment of the apparatus for detecting a position of a center point of a pupil pattern in accordance with the present invention. The second embodiment of the apparatus for detecting a position of a center point of a pupil pattern in accordance with the present invention is constituted basically in the same manner as that for the first embodiment of FIG. 1, except that a voting section 30', which will be described later, is different from the voting section 30 in the first embodiment of FIG. 1. In FIG. 19, similar elements are numbered with the same reference numerals with respect to FIG. 1. Only the operation of the voting section 30' will be described hereinbelow.

In the second embodiment of FIG. 19, the voting section 30' firstly performs the voting of the coordinates of each of pixels (having a pixel value of 1) in the binary image S4 onto the Hough space corresponding to annuluses, which Hough space is defined by the coordinate system having the X coordinate axis for the center point of the circle, the Y coordinate axis for the center point of the circle, and the r coordinate axis for the radial direction. The voting section 30' calculates the vote value of each of voting positions having coordinates (X, Y, r) on the Hough space. A plurality of vote values are obtained with respect to the voting positions having the coordinates (X, Y, r) on the Hough space. Ordinarily, in cases where a vote is given by a certain pixel with respect to one voting position, a value of 1 may be added to the voting value of the voting position. The number of votes having been given to each voting position may thus be calculated cumulatively, and the vote value of each voting position may thereby be acquired. However, in this embodiment, in cases where a vote is given by a certain pixel with respect to one voting position, instead of a value of 1 being added to the vote value of the voting position, the vote value of the voting position is acquired in the manner described below. Specifically, reference is made to the luminance value of the certain pixel, which has given the vote with respect to the voting position, and the vote value of the voting position is acquired with the weighted addition performed on the number of votes having been given by the pixels in the binary image, such that the number of a vote given by a pixel having a low luminance to the voting position is assigned with weight heavier than the weight assigned to the number of a vote given by a pixel having a high luminance to the voting position. The voting section 30' performs the weighting of the vote values by utilizing the table of FIG. 17 showing the weight factors for vote values, and the value obtained from the weighted addition is taken as the integrated vote value W of each voting position. The voting section 30' feeds out the information representing the integrated vote values W, W, . . . , which have thus been obtained, into the center position candidate acquiring section 35, such that it may be clear which integrated vote value W corresponds to which (X, Y, r) coordinate values of the voting position on the Hough space.

The second embodiment of the apparatus for detecting a position of a center point of a pupil pattern in accordance with the present invention illustrated in FIG. 19, in which the voting section 30' is provided, has an accuracy of detection of the position of the center point of the pupil pattern lower than the detection accuracy of first embodiment of FIG. 1. However, since the second embodiment is provided with the collating section 40, the fine adjustment section 45, and the other sections, the position of the center point of the pupil pattern is capable of being detected accurately. Also, since the vote value of each voting position is directly taken as the integrated vote value, the amount of the operation processing is capable of being kept small, and the processing is capable of being performed quickly.

The apparatus for detecting a position of a center point of a circular pattern in accordance with the present invention is not limited to the embodiments described above and may be embodied in various other ways.

For example, in each of the first embodiment shown in FIG. 1 and the second embodiment shown in FIG. 19, the image of the region in the vicinity of the eye pattern (i.e., the trimming image S1), which image has been obtained from the trimming of the photographic image S0, is subjected to the gray conversion, and the gray level image S2 is obtained from the gray conversion. Also, the pre-processing with the pre-processing section 14 is performed on the gray level image S2, the processing that follows is then performed, and the position of the center point of the pupil pattern is thereby detected. Alternatively, instead of the gray conversion being performed, the pre-processing with the pre-processing section 14 may be performed directly on the trimming image S1, the processing that follows may then be performed, and the position of the center point of the pupil pattern may thereby detected.

Also, in each of the first embodiment shown in FIG. 1 and the second embodiment shown in FIG. 19, such that the processing may be performed quickly and such that the required memory capacity may be kept small, the gray level image S2 is binarized, and the voting onto the Hough space is then performed by use of the thus obtained binary image S4. Alternatively, instead of the binarization being performed, the voting onto the Hough space may be directly performed by use of the gray level image S2.

Figure 20A:
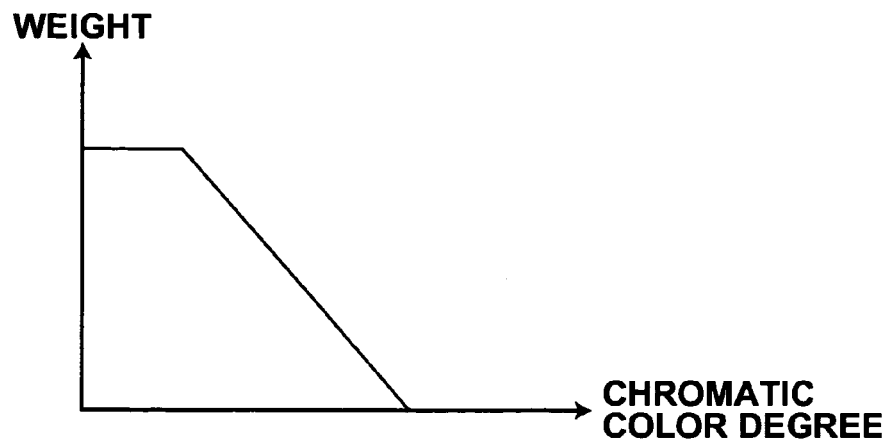
FIG. 20A is an explanatory graph showing an example of how weighted addition is performed on a number of votes having been given by pixels in a photographic image and in accordance with a chromatic color degree of each pixel.
Figure 20B:
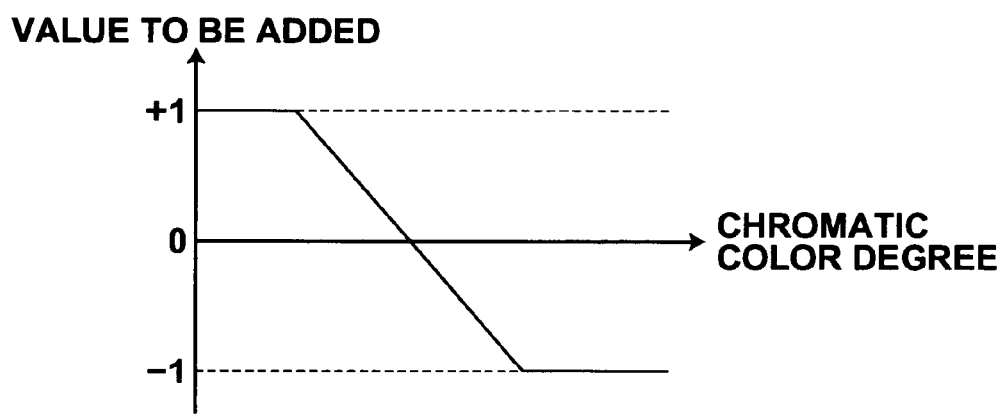
FIG. 20B is an explanatory graph showing a different example of how weighted addition is performed on a number of votes having been given by pixels in a photographic image and in accordance with a chromatic color degree of each pixel.

Further, in each of the first embodiment shown in FIG. 1 and the second embodiment shown in FIG. 19, by the utilization of the characteristics such that a pixel close to the center point of the pupil pattern has a luminance lower than the luminance of a pixel remote from the center point of the pupil pattern, each of the voting section 30 and the voting section 30' performs the weighted addition on the number of votes having been given by the pixels, such that the number of a vote given by a pixel having a low luminance is assigned with weight heavier than the weight assigned to the number of a vote given by a pixel having a high luminance. In this manner, the detection accuracy is enhanced. Also, by the utilization of the characteristics such that the chromatic color degree of the pupil pattern is lower than the chromatic color degree of a skin pattern, a spectacle color frame pattern, a colored hair pattern, or the like, weighted addition may be performed on the number of votes having been given by the pixels such that, as illustrated in FIG. 20A, the number of a vote given by a pixel having a high chromatic color degree is assigned with weight (different from the aforesaid weight assigned in accordance with the luminance) lighter than the weight assigned to the number of a vote given by a pixel having a low chromatic color degree. In such cases, adverse effects of noise due to chromatic color areas other than the pupil pattern are capable of being suppressed, and the detection accuracy is capable of being enhanced even further. The technique for assigning the weight in accordance with the chromatic color degree is not limited to the technique illustrated in FIG. 20A. For example, as illustrated in FIG. 20B, a value to be added, which is set in accordance with the chromatic color degree of a pixel, may be added to the number of the vote given by the pixel.

Figure 21:
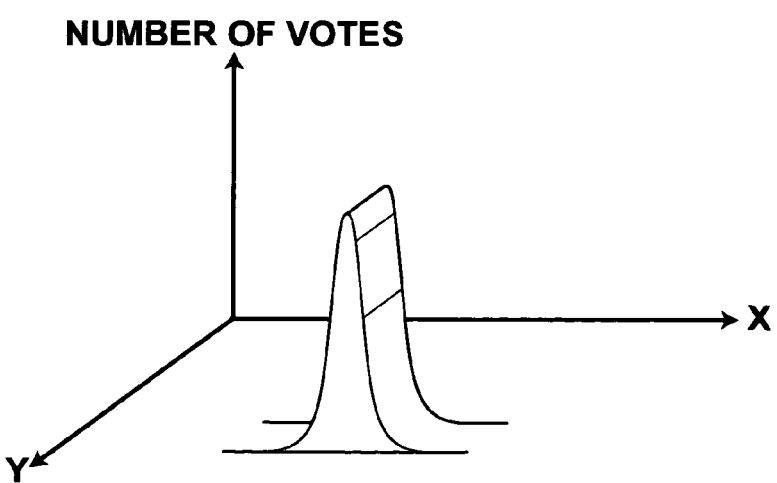
FIG. 21 is an explanatory view showing how a judgment as to noise is made in accordance with a distribution of the number of votes with respect to an X-Y plane.

Furthermore, processing for eliminating noise due to a spectacle frame pattern, a hair pattern, or the like, may be performed. Specifically, for example, the numbers of votes having been given to the voting positions having the coordinates (X, Y, r) on the Hough space may be projected onto the X-Y plane, and the distribution of the numbers of votes with respect to the X-Y plane may thus be obtained. In such cases, it is found that a distinct peak of the number of votes is formed at the point having the coordinates, e.g. the coordinates (X0, Y0), corresponding to the position of the center point of the pupil pattern. Therefore, as illustrated in FIG. 21, in cases where the peak area of the numbers of votes forms a pattern other than a point and has a continuously extending distribution, it may be judged that the peak area of the numbers of votes having the continuously extending distribution represents the noise due to a spectacle frame pattern, a hair pattern, or the like. The peak area of the numbers of votes having the continuously extending distribution is thus capable of being excluded from the candidates for the position of the center point of the pupil pattern.

Also, in the case of the photographic image of the face, it often occurs that the pupil is recorded as a red pupil pattern. The method and apparatus for detecting a position of a center point of a circular pattern in accordance with the present invention is also applicable to the detection of the position of the center point of the red pupil pattern (i.e., the red eye pattern). Further, the method and apparatus for detecting a position of a center point of a circular pattern in accordance with the present invention may be utilized for the processing, wherein the position of the center point of the pupil pattern is detected from the color photographic image of the face before being subjected to the gray conversion, the position of the center point of the pupil pattern is detected from the color photographic image of the face after being subjected to the gray conversion, the thus detected two positions are compared with each other, and a judgment is made in accordance with the results of the comparison and as to whether the pupil pattern contained in the photographic image of the face is or is not the red eye pattern. By way of example, in cases where it has been judged that the pupil pattern contained in the photographic image of the face is the red eye pattern, processing, such as red eye compensation, may be performed.

Furthermore, ordinarily, a circular pattern other than the pupil pattern is not contained in the trimming image obtained from the trimming, in which the outer frame is set in the vicinity of the eye pattern. Also, in the collating section 40, the collation is performed. Therefore, in the voting section 30 employed in the first embodiment shown in FIG. 1, at the time of the acquisition of the integrated vote value W with respect to the voting positions, which have the identical (X, Y) coordinate values on the Hough space corresponding to annuluses, from the addition of the vote values of the voting positions, which have the identical (X, Y) coordinate values, i.e. the identical annulus center point coordinate values, on the Hough space among the voting positions having the coordinates (X, Y, r) on the Hough space, to one another, no limitation is imposed upon the range of the radius, r, which range contains the voting positions subjected to the addition. However, for example, in cases where the range of the value of the radius of the circular pattern (in this case, the pupil pattern) whose center point is to be detected is known, the integrated vote value W may be obtained from the addition of only the vote values of the voting positions falling within the range of the radius of the circular pattern whose center point is to be detected. In such cases, the problems are capable of being prevented from occurring in that a position of a center point of a circular pattern having a radius, which is outside the range of the radius described above, is detected by mistake as the position of the center point of the circular pattern to be detected. In the first embodiment shown in FIG. 1, by way of example, the range of the value of the radius of the pupil pattern may be specified in accordance with the distance D between the two eye patterns, and the integrated vote value W may thereby be obtained.

In the first embodiment shown in FIG. 1 and the second embodiment shown in FIG. 19, in the detecting section 1, the processing for detecting whether a face image is or is not contained in the photographic image S0 is performed. However, in cases where only the digital photographic images, in which a face image is always contained, such as certification photographs, are to be processed, the processing for detecting a face image need not be performed, and the processing for detecting the positions of the eye patterns may be performed directly.

Also, the technique for detecting the face image and the technique for detecting the positions of the eye patterns are not limited to the techniques employed in the detecting section 1, and any of known techniques may be employed as the aforesaid techniques.

Further, in lieu of the detection processing being performed automatically, a position in the vicinity of the eye pattern may be manually specified by the operator, and the trimming may be performed in accordance with the thus specified position.

In the first embodiment shown in FIG. 1 and the second embodiment shown in FIG. 19, such that the accuracy of the position of the center point of the pupil pattern having been detected may be enhanced, the fine adjustment section 45 is utilized in order to perform the fine adjustment on the position of the center point of the pupil pattern having been detected. However, the fine adjustment need not necessarily be performed.

Also, in cases where the fine adjustment is to be performed, in lieu of the masking operation processing being performed on the binary image, the masking operation processing on the pre-processed gray level photographic image may be iterated several times, and a position of a pixel associated with the maximum result value may be obtained from the results of the masking operation processing. Further, the fine adjustment of the position of the center point of the pupil pattern may be performed in accordance with the thus obtained position of the pixel associated with the maximum result value. Furthermore, the mask for the masking operation processing is not limited to the mask having a size of 9×9 as in the fine adjustment section 45, and a mask having a different size, e.g. a size of 5×5, may be employed.

In the embodiments described above, the information, which represents the positions of the center points of the pupil patterns having been detected, is stored on the recording medium, such that which information corresponds to which photographic image. Alternatively, the information, which represents the positions of the center points of the pupil patterns having been detected, may be outputted into an image processing system for performing image processing in accordance with the positions of the center points of the pupil patterns. As another alternative, the information, which represents the positions of the center points of the pupil patterns having been detected, may be outputted into an apparatus for trimming a photographic image of a face in accordance with the positions of the center points of the pupil patterns. The information, which represents the positions of the center points of the pupil patterns having been detected, may thus be outputted into various processing systems in which the information representing the positions of the center points of the pupil patterns is necessary.

Further, besides the detection of the position of the center point of the pupil pattern, the apparatus for detecting a position of a center point of a circular pattern in accordance with the present invention is applicable to the detection of the positions of the center points of various other circular patterns.

What is claimed is:

1. A method of detecting a position of a center point of a circular pattern, in which a position of a center point of a circular pattern contained in a photographic image is detected from the photographic image, the method comprising the steps of:

i) performing voting of coordinates of all pixels in the photographic image onto a Hough space corresponding to annuluses, which Hough space is defined by a coordinate system having an X coordinate axis for a center point of a circle, a Y coordinate axis for a center point of a circle, and an r coordinate axis for a radial direction, ii) acquiring a vote value of each of voting positions having coordinates (X, Y, r) on the Hough space from a calculation of a number of votes having been given to each of the voting positions having the coordinates (X, Y, r) on the Hough space, the thus acquired vote value being taken as a first integrated vote value, a plurality of first integrated vote values being obtained with respect to the voting positions having the coordinates (X, Y, r) on the Hough space, and iii) detecting a position, which is represented by (X, Y) coordinate values of a voting position associated with the largest first integrated vote value among the plurality of the first integrated vote values having been obtained with respect to the voting positions having the coordinates (X, Y, r) on the Hough space, as the position of the center point of the circular pattern, wherein weighted addition is performed on the number of votes having been given by all of the pixels in the photographic image, and wherein the number of a vote given by a pixel having a high chromatic color degree is assigned with a weight lighter than the weight assigned to the number of a vote given by a pixel having a low chromatic color degree, and a value having been obtained from the weighted addition is taken as the vote value.

2. A method of detecting a position of a center point of a circular pattern, in which a position of a center point of a circular pattern contained in a photographic image is detected from the photographic image, the method comprising the steps of:

i) performing voting of coordinates of all pixels in the photographic image onto a Hough space corresponding to annuluses, which Hough space is defined by a coordinate system having an X coordinate axis for a center point of a circle, a Y coordinate axis for a center point of a circle, and an r coordinate axis for a radial direction, ii) acquiring a vote value of each of voting positions having coordinates (X, Y, r) on the Hough space from a calculation of a number of votes having been given to each of the voting positions having the coordinates (X, Y, r) on the Hough space, a plurality of vote values being obtained with respect to the voting positions having the coordinates (X, Y, r) on the Hough space, iii) adding the vote values of voting positions, which have identical (X, Y) coordinate values on the Hough space among the voting positions having the coordinates (X, Y, r) on the Hough space, to one another, a second integrated vote value being obtained from the addition and with respect to the voting positions, which have the identical (X, Y) coordinate values on the Hough space, a plurality of second integrated vote values being obtained with respect to the voting positions having the coordinates (X, Y, r) on the Hough space, and iv) detecting a position, which is represented by (X, Y) coordinate values corresponding to the largest second integrated vote value among the plurality of the second integrated vote values having been obtained with respect to the voting positions having the coordinates (X, Y, r) on the Hough space, as the position of the center point of the circular pattern, wherein weighted addition is performed on the number of votes having been given by all of the pixels in the photographic image, and wherein the number of a vote given by a pixel having a high chromatic color degree is assigned with a weight lighter than the weight assigned to the number of a vote given by a pixel having a low chromatic color degree, and a value having been obtained from the weighted addition is taken as the vote value.

3. The method as defined in claim 2 wherein only the vote values of voting positions falling within a range of a radius of the circular pattern, which voting positions are among the voting positions having the identical (X, Y) coordinate values on the Hough space, are added to one another, and the second integrated vote value is obtained from the addition.

4. The method as defined in claim 1 wherein the photographic image contains a pupil pattern, and the circular pattern is the pupil pattern.

5. The method as defined in claim 4 wherein the photographic image, which is a color photographic image, is converted into a gray level photographic image, and the voting is performed by use of the gray level photographic image.

6. The method as defined in claim 5 wherein the gray level photographic image is binarized by use of a predetermined threshold value, a binary image being obtained from the binarization, and the voting is performed by use of the binary image.

7. The method as defined in claim 4 wherein the weighted addition is performed on the number of votes having been given by the pixels in the photographic image, and wherein the number of a vote given by a pixel having a low luminance is assigned with the weight heavier than the weight assigned to the number of a vote given by a pixel having a high luminance, and the value having been obtained from the weighted addition is taken as the vote value.

8. The method as defined in claim 4 wherein a photographic image of a face is subjected to trimming, in which an outer frame is set in a region in the vicinity of an eye pattern, a trimming image being obtained from the trimming, and the trimming image is taken as the photographic image.

9. The method as defined in claim 8 wherein a position of the eye pattern is detected from the photographic image of the face, and the trimming is performed in accordance with the thus detected position of the eye pattern.

10. An apparatus for detecting a position of a center point of a circular pattern, in which a position of a center point of a circular pattern contained in a photographic image is detected from the photographic image, the apparatus comprising:

i) vote value acquiring means for:

performing voting of coordinates of all pixels in the photographic image onto a Hough space corresponding to annuluses, which Hough space is defined by a coordinate system having an X coordinate axis for a center point of a circle, a Y coordinate axis for a center point of a circle, and an r coordinate axis for a radial direction, and acquiring a vote value of each of voting positions having coordinates (X, Y, r) on the Hough space from a calculation of a number of votes having been given to each of the voting positions having the coordinates (X, Y, r) on the Hough space, the thus acquired vote value being taken as a first integrated vote value, a plurality of first integrated vote values being obtained with respect to the voting positions having the coordinates (X, Y, r) on the Hough space, and ii) center position detecting means for detecting a position, which is represented by (X, Y) coordinate values of a voting position associated with the largest first integrated vote value among the plurality of the first integrated vote values having been obtained with respect to the voting positions having the coordinates (X, Y, r) on the Hough space, as the position of the center point of the circular pattern, wherein weighted addition is performed on the number of votes having been given by all of the pixels in the photographic image, and wherein the number of a vote given by a pixel having a high chromatic color degree is assigned with a weight lighter than the weight assigned to the number of a vote given by a pixel having a low chromatic color degree, and a value having been obtained from the weighted addition is taken as the vote value.

11. An apparatus for detecting a position of a center point of a circular pattern, in which a position of a center point of a circular pattern contained in a photographic image is detected from the photographic image, the apparatus comprising:

i) vote value acquiring means for:

performing voting of coordinates of all pixels in the photographic image onto a Hough space corresponding to annuluses, which Hough space is defined by a coordinate system having an X coordinate axis for a center point of a circle, a Y coordinate axis for a center point of a circle, and an r coordinate axis for a radial direction, and acquiring a vote value of each of voting positions having coordinates (X, Y, r) on the Hough space from a calculation of a number of votes having been given to each of the voting positions having the coordinates (X, Y, r) on the Hough space, a plurality of vote values being obtained with respect to the voting positions having the coordinates (X, Y, r) on the Hough space, ii) vote value integrating means for adding the vote values of voting positions, which have identical (X, Y) coordinate values on the Hough space among the voting positions having the coordinates (X, Y, r) on the Hough space, to one another, a second integrated vote value being obtained from the addition and with respect to the voting positions, which have the identical (X, Y) coordinate values on the Hough space, a plurality of second integrated vote values being obtained with respect to the voting positions having the coordinates (X, Y, r) on the Hough space, and iii) center position detecting means for detecting a position, which is represented by (X, Y) coordinate values corresponding to the largest second integrated vote value among the plurality of the second integrated vote values having been obtained with respect to the voting positions having the coordinates (X, Y, r) on the Hough space, as the position of the center point of the circular patterns, wherein weighted addition is performed on the number of votes having been given by all of the pixels in the photographic image, and wherein the number of a vote given by a pixel having a high chromatic color degree is assigned with a weight lighter than the weight assigned to the number of a vote given by a pixel having a low chromatic color degree, and a value having been obtained from the weighted addition is taken as the vote value.

12. The apparatus as defined in claim 11 wherein the vote value integrating means adds only the vote values of voting positions falling within a range of a radius of the circular pattern, which voting positions are among the voting positions having the identical (X, Y) coordinate values on the Hough space, to one another, and the second integrated vote value is obtained from the addition.

13. The apparatus as defined in claim 10 wherein the photographic image contains a pupil pattern, and the circular pattern is the pupil pattern.

14. The apparatus as defined in claim 13 wherein the apparatus further comprises image converting means for performing gray conversion of the photographic image, which is a color photographic image, to obtain a gray level photographic image, and the vote value acquiring means performs the voting by use of the gray level photographic image.

15. The apparatus as defined in claim 14 wherein the apparatus further comprises binarizing means for binarizing the gray level photographic image by use of a predetermined threshold value to obtain a binary image, and the vote value acquiring means performs the voting by use of the binary image.

16. The apparatus as defined in claim 13 wherein the vote value acquiring means performs the weighted addition on the number of votes having been given by the pixels in the photographic image, and wherein the number of a vote given by a pixel having a low luminance is assigned with the weight heavier than the weight assigned to the number of a vote given by a pixel having a high luminance, and the vote value acquiring means takes the value which has been obtained from the weighted addition, as the vote value.

17. The apparatus as defined in claim 13 wherein the apparatus further comprises trimming means for:
- subjecting a photographic image of a face to trimming, in which an outer frame is set in a region in the vicinity of an eye pattern, to obtain a trimming image, and
- taking the trimming image as the photographic image.

18. The apparatus as defined in claim 17 wherein the apparatus further comprises eye pattern position detecting means for:
- detecting a position of the eye pattern from the photographic image of the face, and
- feeding information, which represents the thus detected position of the eye pattern, into the trimming means.

19. The apparatus as defined in claim 17 wherein the apparatus further comprises collating means for:
- making a judgment as to whether the position of the center point of the pupil pattern, which position has been detected, is or is not correct, the judgment being made in accordance with a criterion in that a difference between a position of a center point of a left pupil pattern, which position has been detected by use of a trimming image of a left eye pattern, and a position of a center point of a right pupil pattern, which position has been detected by use of a trimming image of a right eye pattern, will fall within a predetermined range in accordance with a distance between the left eye pattern and the right eye pattern,
- obtaining the second largest integrated vote value that ranks next to the integrated vote value corresponding to the position of the center point of the pupil pattern, which position has been detected most recently, until the position of the center point of the pupil pattern, which position has been detected, is judged as being correct, and
- detecting a position, which is represented by (X, Y) coordinate values of a voting position associated with the second largest integrated vote value, as the position of the center point of the pupil pattern.

20. The apparatus as defined in claim 19 wherein the collating means obtains the second largest integrated vote value from integrated vote values, each of which corresponds to (X, Y) coordinate values representing a position spaced at least a predetermined distance away from the position of the center point of the pupil pattern having been detected most recently.

21. The apparatus as defined in claim 13 wherein the apparatus further comprises pre-processing means for:
- performing blank filling processing on the photographic image, and
- presenting the photographic image, which has been obtained from the blank filling processing, to the vote value acquiring means.

22. A computer recording medium storing a program which, when executed by a computer, causes the computer to execute processing for detecting a position of a center point of a circular pattern, in which a position of a center point of a circular pattern contained in a photographic image is detected from the photographic image,
wherein the processing for detecting a position of a center point of a circular pattern comprises:
i) a vote value acquiring process for:
- performing voting of coordinates of all pixels in the photographic image onto a Hough space corresponding to annuluses, which Hough space is defined by a coordinate system having an X coordinate axis for a center point of a circle, a Y coordinate axis for a center point of a circle, and an r coordinate axis for a radial direction, and
- acquiring a vote value of each of voting positions having coordinates (X, Y, r) on the Hough space from a calculation of a number of votes having been given to each of the voting positions having the coordinates (X, Y, r) on the Hough space, the thus acquired vote value being taken as a first integrated vote value, a plurality of first integrated vote values being obtained with respect to the voting positions having the coordinates (X, Y, r) on the Hough space, and ii) a center position detecting process for detecting a position, which is represented by (X, Y) coordinate values of a voting position associated with the largest first integrated vote value among the plurality of the first integrated vote values having been obtained with respect to the voting positions having the coordinates (X, Y, r) on the Hough space, as the position of the center point of the circular patterns wherein weighted addition is performed on the number of votes having been given by all of the pixels in the photographic image, and wherein the number of a vote given by a pixel having a high chromatic color degree is assigned with a weight lighter than the weight assigned to the number of a vote given by a pixel having a low chromatic color degree, and a value having been obtained from the weighted addition is taken as the vote value.

23. A computer recording medium storing a program which, when executed by a computer, causes the computer to execute processing for detecting a position of a center point of a circular pattern, in which a position of a center point of a circular pattern contained in a photographic image is detected from the photographic image,
wherein the processing for detecting a position of a center point of a circular pattern comprises:
i) a vote value acquiring process for:
- performing voting of coordinates of all pixels in the photographic image onto a Hough space corresponding to annuluses, which Hough space is defined by a coordinate system having an X coordinate axis for a center point of a circle, a Y coordinate axis for a center point of a circle, and an r coordinate axis for a radial direction, and
- acquiring a vote value of each of voting positions having coordinates (X, Y, r) on the Hough space from a calculation of a number of votes having been given to each of the voting positions having the coordinates (X, Y, r) on the Hough space, a plurality of vote values being obtained with respect to the voting positions having the coordinates (X, Y, r) on the Hough space, ii) a vote value integrating process for adding the vote values of voting positions, which have identical (X, Y) coordinate values on the Hough space among the voting positions having the coordinates (X, Y, r) on the Hough space, to one another, a second integrated vote value being obtained from the addition and with respect to the voting positions, which have the identical (X, Y) coordinate values on the Hough space, a plurality of second integrated vote values being obtained with respect to the voting positions having the coordinates (X, Y, r) on the Hough space, and iii) a center position detecting process for detecting a position, which is represented by (X, Y) coordinate values corresponding to the largest second integrated vote value among the plurality of the second integrated vote values having been obtained with respect to the voting positions having the coordinates (X, Y, r) on the Hough space, as the position of the center point of the circular pattern, wherein weighted addition is performed on the number of votes having been given by all of the pixels in the photographic image, and wherein the number of a vote given by a pixel having a high chromatic color degree is assigned with a weight lighter than the weight assigned to the number of a vote given by a pixel having a low chromatic color degree, and a value having been obtained from the weighted addition is taken as the vote value.

24. The medium as defined in claim 23 wherein the vote value integrating process is a process for adding only the vote values of voting positions falling within a range of a radius of the circular pattern, which voting positions are among the voting positions having the identical (X, Y) coordinate values on the Hough space, to one another, and the second integrated vote value is obtained from the addition.

25. The medium as defined in claim 22 wherein the photographic image contains a pupil pattern, and the circular pattern is the pupil pattern.

26. The medium as defined in claim 25 wherein the processing for detecting a position of a center point of a circular pattern further comprises an image converting process for performing gray conversion of the photographic image, which is a color photographic image, in order to obtain a gray level photographic image, and the vote value acquiring process is a process for performing the voting by use of the gray level photographic image.

27. The medium as defined in claim 26 wherein the processing for detecting a position of a center point of a circular pattern further comprises a binarizing process for binarizing the gray level photographic image by use of a predetermined threshold value in order to obtain a binary image, and the vote value acquiring process is a process for performing the voting by use of the binary image.

28. The medium as defined in claim 25 wherein the vote value acquiring process is a process for:

performing weighted addition on the number of votes having been given by the pixels in the photographic image, wherein the number of a vote given by a pixel having a low luminance is assigned with the weight heavier than the weight assigned to the number of a vote given by a pixel having a high luminance, and taking the value which has been obtained from the weighted addition, as the vote value.

29. The medium as defined in claim 25 wherein the processing for detecting a position of a center point of a circular pattern further comprises a trimming process for:

subjecting a photographic image of a face to trimming, in which an outer frame is set in a region in the vicinity of an eye pattern, in order to obtain a trimming image, and taking the trimming image as the photographic image.

30. The medium as defined in claim 29 wherein the trimming process comprises an eye pattern position detecting process for detecting a position of the eye pattern from the photographic image of the face, and the trimming process performs the trimming in accordance with the position of the eye pattern having been detected with the eye pattern position detecting process.

* * * * *